United States Patent
Popov et al.

(10) Patent No.: US 11,885,907 B2
(45) Date of Patent: Jan. 30, 2024

(54) DEEP NEURAL NETWORK FOR DETECTING OBSTACLE INSTANCES USING RADAR SENSORS IN AUTONOMOUS MACHINE APPLICATIONS

(71) Applicant: NVIDIA Corporation, Santa Clara, CA (US)

(72) Inventors: Alexander Popov, Kirkland, WA (US); Nikolai Smolyanskiy, Seattle, WA (US); Ryan Oldja, Redmond, WA (US); Shane Murray, San Jose, CA (US); Tilman Wekel, Sunnyvale, CA (US); David Nister, Bellevue, WA (US); Joachim Pehserl, Lynnwood, WA (US); Ruchi Bhargava, Redmond, WA (US); Sangmin Oh, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 251 days.

(21) Appl. No.: 16/836,583

(22) Filed: Mar. 31, 2020

(65) Prior Publication Data
US 2021/0156960 A1    May 27, 2021

Related U.S. Application Data

(60) Provisional application No. 62/938,852, filed on Nov. 21, 2019.

(51) Int. Cl.
*G01S 7/295* (2006.01)
*G06T 7/246* (2017.01)
(Continued)

(52) U.S. Cl.
CPC ............ *G01S 7/2955* (2013.01); *G01S 7/414* (2013.01); *G01S 7/417* (2013.01); *G01S 13/931* (2013.01);
(Continued)

(58) Field of Classification Search
CPC ........ G01S 7/414; G01S 7/417; G01S 13/931; G06T 7/246; G06T 7/73;
(Continued)

(56) References Cited

U.S. PATENT DOCUMENTS 9,098,754 B1    8/2015    Stout et al.
9,286,538 B1    3/2016    Chen et al.
(Continued)

FOREIGN PATENT DOCUMENTS

EP    3 525 000 A1    8/2019

OTHER PUBLICATIONS

Nezhadarya Ehsan et al: "BoxNet: A Deep Learning Method for 2D Bounding Box Estimation from Bird's-Eye View Point Cloud", 2019 IEEE Intelligent Vehicles Symposium (IV), IEEE, Jun. 9, 2019, pp. 1557-1564, XP033606092, DOI: 10.1109/IVS.2019.8814058, [retrieved on Aug. 26, 2019] (Year: 2019).*

(Continued)

*Primary Examiner* — Peter M Bythrow
*Assistant Examiner* — Nazra Nur Waheed
(74) *Attorney, Agent, or Firm* — Shook, Hardy & Bacon L.L.P.

(57) ABSTRACT

In various examples, a deep neural network(s) (e.g., a convolutional neural network) may be trained to detect moving and stationary obstacles from RADAR data of a three dimensional (3D) space, in both highway and urban scenarios. RADAR detections may be accumulated, ego-motion-compensated, orthographically projected, and fed into a neural network(s). The neural network(s) may include a common trunk with a feature extractor and several heads that predict different outputs such as a class confidence head that predicts a confidence map and an instance regression head that predicts object instance data for detected objects. The outputs may be decoded, filtered, and/or clustered to (Continued)

form bounding shapes identifying the location, size, and/or orientation of detected object instances. The detected object instances may be provided to an autonomous vehicle drive stack to enable safe planning and control of the autonomous vehicle.

20 Claims, 17 Drawing Sheets

(51) Int. Cl.
```
G06T 7/73      (2017.01)
G01S 7/41      (2006.01)
G01S 13/931    (2020.01)
G06N 3/08      (2023.01)
G06V 10/764    (2022.01)
G06V 10/82     (2022.01)
G06V 20/58     (2022.01)
G06V 20/64     (2022.01)
```
(52) U.S. Cl.
CPC ............... *G06N 3/08* (2013.01); *G06T 7/246* (2017.01); *G06T 7/73* (2017.01); *G06V 10/764* (2022.01); *G06V 10/82* (2022.01); *G06V 20/58* (2022.01); *G06V 20/64* (2022.01); *G06T 2207/10044* (2013.01); *G06T 2207/20084* (2013.01); *G06T 2207/30261* (2013.01)

(58) Field of Classification Search
CPC . G06T 2207/10044; G06T 2207/20084; G06T 2207/30261; G06N 3/08
See application file for complete search history.

(56) References Cited

U.S. PATENT DOCUMENTS

| | | | |
|---|---|---|---|
| 10,593,042 B1* | 3/2020 | Douillard | G06V 20/64 |
| 10,809,361 B2 | 10/2020 | Vallespi-Gonzalez et al. | |
| 10,825,188 B1* | 11/2020 | Tan | G06T 7/73 |
| 10,860,034 B1 | 12/2020 | Ziyaee et al. | |
| 10,885,698 B2 | 1/2021 | Muthler et al. | |
| 10,915,793 B2 | 2/2021 | Corral-Soto et al. | |
| 10,970,871 B2* | 4/2021 | Nezhadarya | G06T 7/73 |
| 11,062,454 B1* | 7/2021 | Cohen | G01S 7/417 |
| 11,380,108 B1 | 7/2022 | Cai et al. | |
| 2015/0036870 A1 | 2/2015 | Mundhenk et al. | |
| 2016/0073080 A1 | 3/2016 | Wagner et al. | |
| 2018/0108134 A1 | 4/2018 | Venable et al. | |
| 2018/0173971 A1 | 6/2018 | Jia et al. | |
| 2018/0314253 A1* | 11/2018 | Mercep | G01S 7/4808 |
| 2018/0349746 A1 | 12/2018 | Vallespi-Gonzalez | |
| 2019/0026588 A1 | 1/2019 | Ryan | |
| 2019/0145765 A1* | 5/2019 | Luo | G06V 10/454 |
| | | | 702/153 |
| 2019/0147610 A1 | 5/2019 | Frossard et al. | |
| 2019/0324148 A1 | 10/2019 | Kim et al. | |
| 2019/0361454 A1 | 11/2019 | Zeng et al. | |
| 2020/0013219 A1 | 1/2020 | Dhua et al. | |
| 2020/0175326 A1 | 6/2020 | Shen et al. | |
| 2020/0193606 A1 | 6/2020 | Douillard et al. | |
| 2020/0301013 A1 | 9/2020 | Banerjee et al. | |
| 2021/0082181 A1 | 3/2021 | Shi et al. | |
| 2021/0096241 A1* | 4/2021 | Bongio Karrman | G01S 13/42 |
| 2021/0109523 A1 | 4/2021 | Zou et al. | |
| 2021/0146952 A1* | 5/2021 | Vora | B60W 60/001 |
| 2021/0149051 A1* | 5/2021 | Ding | G01S 17/931 |
| 2021/0166426 A1 | 6/2021 | McCormac et al. | |
| 2021/0181758 A1 | 6/2021 | Das et al. | |
| 2022/0327743 A1 | 10/2022 | Oh et al. | |

OTHER PUBLICATIONS

"Taxonomy and Definitions for Terms Related to Driving Automation Systems for On-Road Motor Vehicles", Society of Automotive Engineers (SAE), Standard No. J3016-201609, pp. 1-30 (Sep. 30, 2016).

"Taxonomy and Definitions for Terms Related to Driving Automation Systems for On-Road Motor Vehicles", Society of Automotive Engineers (SAE), Standard No. J3016-201806, pp. 1-35 (Jun. 15, 2018).

Chen, X., et al., "Multi-View 3D Object Detection Network for Autonomous Driving", Cornell University Library, pp. 1-9 (Nov. 23, 2016).

Ku, J., et al., "Joint 3D Proposal Generation and Object Detection from View Aggregation", IEEE/RSJ International Conference on Intelligent Robots and Systems, pp. 1-8 (Oct. 2018).

Nezhadarya, E., et al., "BoxNet: A Deep Learning Method for 2D Bounding Box Estimation from Bird's-Eye View Point Cloud", IEEE Intelligent Vehicles Symposium (IV), pp. 1557-1564 (Jun. 2019).

Zhou, Y., et al. "End-to-End Multi-View Fusion for 3D Object Detection in LiDAR Point Clouds" Cornell University Library, pp. 1-10 (Oct. 2019).

Partial European Search Report and Opinion received for European Patent Application No. 20206733.6, dated Apr. 13, 2021, 17 pages.

Extended European Search Report and Opinion received for European Patent Application No. 20204403.8, dated May 6, 2021, 13 pages.

Extended European Search Report and Opinion received for European Patent Application No. 20205868.1, dated May 10, 2021, 14 pages.

Extended European Search Report and Opinion received for European Patent Application No. 20206733.6, dated Jul. 20, 2021, 12 pages.

Non-Final Office Action dated Aug. 19, 2021 in U.S. Appl. No. 16/915,346, 17 pages.

Geus, D. D., et al., "Single Network Panoptic Segmentation for Street Scene Understanding", IEEE Intelligent Vehicles Symposium (IV), pp. 709-715 (Jun. 2019).

Liu, H., et al., "An End-To-End Network for Panoptic Segmentation", IEEE/CVF Conference on Computer Vision and Pattern Recognition (CVPR), pp. 6165-6174 (2019).

Xiong, Y., et al., "UPSNet: a Unified Panoptic Segmentation Network", IEEE/CVF Conference on Computer Vision and Pattern Recognition, pp. 8810-8818 (2019).

Zhang, W., et al., "LiSeg: Lightweight Road-object Semantic Segmentation in 3D LiDAR Scans for Autonomous Driving", IEEE Intelligent Vehicles Symposium(IV), pp. 1021-1026 (Jun. 2018).

International Search Report and Written Opinion received for PCT Patent Application No. PCT/US2020/043611, dated Nov. 4, 2020, 14 pages.

Kendall, A., & Gal, Y. (2017). What uncertainties do we need in bayesian deep learning for computer vision ?. In Advances in neural information processing systems (pp. 5574-5584).

Furukawa, H. (2018). Deep learning for end-to-end automatic target recognition from synthetic aperture radar imagery. arXiv preprint arXiv:1801.08558.

Kendall, A., Gal, Y., & Cipolla, R. (2018). Multi-task learning using uncertainty to weigh losses for scene geometry and semantics. In Proceedings of the IEEE conference on computer vision and pattern recognition (pp. 7482-7491).

Ronneberger, O., Fischer, P., & Brox, T. (Oct. 2015). U-net: Convolutional networks for biomedical image segmentation. In International Conference on Medical image computing and computer-assisted intervention (pp. 234-241). Springer, Cham.

Szegedy, C., Liu, W., Jia, Y., Sermanet, P., Reed, S., Anguelov, D., . . . & Rabinovich, A. (2015). Going deeper with convolutions. In Proceedings of the IEEE conference on computer vision and pattern recognition (pp. 1-9).

He, K., Zhang, X., Ren, S., & Sun, J. (2016). Deep residual learning for image recognition. In Proceedings of the IEEE conference on computer vision and pattern recognition (pp. 770-778).

Krizhevsky, A., Sutskever, I., & Hinton, G. E. (2012). Imagenet classification with deep convolutional neural networks. In Advances in neural information processing systems (pp. 1097-1105).

(56) References Cited

OTHER PUBLICATIONS

IEC 61508, "Functional Safety of Electrical/Electronic/Programmable Electronic Safety-related Systems (E/E/PE, or E/E/PES)," Retrieved from Internet URL: https://en.wikipedia.org/wiki/IEC_61508, accessed on Apr. 1, 2022, 7 pages.

ISO 26262, "Road vehicle—Functional safety," International Standard for Functional Safety of Electronic System, Retrieved from Internet URL: https://en.wikipedia.org/wiki/ISO_26262, accessed on Sep. 13, 2021, 8 pages.

Kirillov, A., et al., "Panoptic Segmentation", In Proceedings of the IEEE Conference on Computer Vision and Pattern Recognition, pp. 1-10 (2019).

Luo, W., et al., "Fast and Furious: Real Time End-to-End 3D Detection, Tracking and Motion Forecasting with a Single Convolutional Net", In Proceedings of the IEEE conference on Computer Vision and Pattern Recognition, pp. 3569-3577 (2018).

Qi, C.R., et al., "PointNet: Deep Learning on Point Sets for 3D Classification and Segmentation", In Proceedings of the IEEE Conference on Computer Vision and Pattern Recognition, pp. 652-660 (2017).

International Preliminary Report on Patentability received for PCT Application No. PCT/US2020/043611, dated Feb. 3, 2022, 9 pages.

Non-Final Office Action dated Feb. 11, 2022 in U.S. Appl. No. 16/915,346, 24 pages.

Preinterview First Office Action dated Apr. 25, 2022 in U.S. Appl. No. 16/836,618, 4 pages.

Notice of Allowance dated Jul. 7, 2022 in U.S. Appl. No. 16/915,346, 8 pages.

Notice of Allowance dated Aug. 3, 2022 in U.S. Appl. No. 16/836,618, 8 pages.

Non-Final Office Action dated Oct. 17, 2022 in U.S. Appl. No. 16/938,706, 33 pages.

Non-Final Office Action dated Oct. 20, 2022 in U.S. Appl. No. 17/377,053, 29 pages.

Non-Final Office Action dated Mar. 31, 2023 in U.S. Appl. No. 17/895,940, 14 pages.

Final Office Action dated Feb. 22, 2023 in U.S. Appl. No. 17/377,053, 31 pages.

Final Office Action dated Apr. 10, 2023 in U.S. Appl. No. 16/938,706, 12 pages.

Non-Final Office Action dated May 5, 2023 in U.S. Appl. No. 17/377,064, 9 pages.

Erhan, D., et al., "Scalable Object Detection using Deep Neural Networks", In Proceedings of the IEEE Conference on Computer Vision and Pattern Recognition (CVPR), IEEE, pp. 8 (2014).

Non-Final Office Action dated Jun. 23, 2023 in U.S. Appl. No. 16/938,706, 11 pages.

Notice of Allowance dated Jul. 6, 2023 in U.S. Appl. No. 17/895,940, 8 pages.

Non-Final Office Action dated Jul. 13, 2023 in U.S. Appl. No. 17/377,053, 40 pages.

Office Action received for European Patent Application No. 20206733.6, dated May 22, 2023, 4 pages.

Notice of Allowance dated Oct. 4, 2023 in U.S. Appl. No. 16/938,706, 8 pages.

Final Office Action dated Oct. 17, 2023 in U.S. Appl. No. 17/377,064, 10 pages.

Non-Final Office Action dated Nov. 7, 2023 in U.S. Appl. No. 17/976,581, 8 pages.

Final Office Action dated Nov. 13, 2023 in U.S. Appl. No. 17/377,053, 18 pages.

\* cited by examiner

LIDAR

RADAR

DEEP NEURAL NETWORK FOR DETECTING OBSTACLE INSTANCES USING RADAR SENSORS IN AUTONOMOUS MACHINE APPLICATIONS

CROSS-REFERENCE TO RELATED APPLICATIONS

This application claims the benefit of U.S. Provisional Application No. 62/938,852, filed on Nov. 21, 2019, which is hereby incorporated by reference in its entirety.

BACKGROUND

Designing a system to safely drive a vehicle autonomously without supervision is tremendously difficult. An autonomous vehicle should at least be capable of performing as a functional equivalent of an attentive driver—who draws upon a perception and action system that has an incredible ability to identify and react to moving and static obstacles in a complex environment—to avoid colliding with other objects or structures along the path of the vehicle. Thus, the ability to detect instances of moving or stationary actors (e.g., cars, pedestrians, etc.) is a critical component of autonomous driving perception systems. This capability has become increasingly important as the operational environment for the autonomous vehicle has begun to expand from highway environments to semi-urban and urban settings characterized by complex scenes with many occlusions and complex shapes.

Conventional perception methods rely heavily on the use of cameras or LIDAR sensors to detect obstacles in a scene. However, these conventional approaches have a number of drawbacks. For example, conventional detection techniques are unreliable in scenes with heavy occlusions. Furthermore, conventional sensing techniques are generally unreliable in inclement weather conditions, and the underlying sensors are often prohibitively expensive. Moreover, because the output signal from these conventional systems requires heavy post-processing in order to extract accurate three-dimensional (3D) information, the run-time of these conventional systems is generally higher and requires additional computational and processing demands, thereby reducing the efficiency of these conventional systems.

Some conventional techniques use RADAR sensors to detect moving, reflective objects. However, many conventional RADAR detection techniques struggle or entirely fail to disambiguate obstacles from background noise in a cluttered environment. Furthermore, while some traditional RADAR detection techniques work well when detecting moving, RADAR-reflective objects, they often struggle or entirely fail to distinguish stationary objects from background noise. Similarly, traditional RADAR detection techniques have a limited accuracy in predicting object classification, dimension, and orientation.

SUMMARY

Embodiments of the present disclosure relate to object detection for autonomous machines using deep neural networks (DNNs). Systems and methods are disclosed that use object detection techniques to identify or detect instances of moving or stationary obstacles (e.g., cars, trucks, pedestrians, cyclists, etc.) and other objects within environments for use by autonomous vehicles, semi-autonomous vehicles, robots, and/or other object types.

In contrast to conventional systems, such as those described above, the system of the present disclosure may implement a deep learning solution (e.g., using a deep neural network (DNN), such as a convolutional neural network (CNN)) for autonomous vehicles to detect moving and stationary obstacles and other objects from RADAR data. More specifically, a neural network(s) may be trained to detect moving and stationary obstacles from RADAR data of a three dimensional (3D) space. RADAR detections may be accumulated, ego-motion-compensated, orthographically projected, and fed into a neural network(s). The neural network(s) may include a common trunk with a feature extractor and several heads that predict different outputs such as a class confidence head that predicts a confidence map of objects "being present" and an instance regression head that predicts object instance data (e.g., location, dimensions, pose, orientation, etc.) for detected objects. The outputs may be decoded, filtered, and/or clustered to form bounding shapes identifying the location, size, and/or orientation of detected object instances. The detected object instances may be provided to an autonomous machine control stack to enable safe planning and control of an autonomous machine.

In some embodiments, ground truth training data for the neural network(s) may be generated from LIDAR data. More specifically, a scene may be observed with RADAR and LIDAR sensors to collect RADAR data and LIDAR data for a particular time slice. The RADAR data may be used for input training data, and the LIDAR data associated with the same or closest time slice as the RADAR data may be annotated with ground truth labels identifying objects to be detected. The LIDAR labels may be propagated to the RADAR data, and LIDAR labels containing less than some threshold number of RADAR detections may be omitted. The (remaining) LIDAR labels may be used to generate ground truth data. As such, the training data may be used to train the DNN to detect moving and stationary obstacles and other objects from RADAR data.

Unlike conventional approaches, the present techniques may be used to distinguish between stationary obstacles—such as cars—and stationary background noise, which is particularly important when navigating in a cluttered urban environment. Moreover, since embodiments of the present disclosure may rely on RADAR data in operation, object detections may be performed in inclement weather and at night, in situations where camera-based and LIDAR-based detection techniques degrade and fail.

BRIEF DESCRIPTION OF THE DRAWINGS

The present systems and methods for detecting obstacle instances using RADAR sensors in autonomous machine applications are described in detail below with reference to the attached drawing figures, wherein.

DETAILED DESCRIPTION

Figure 1:
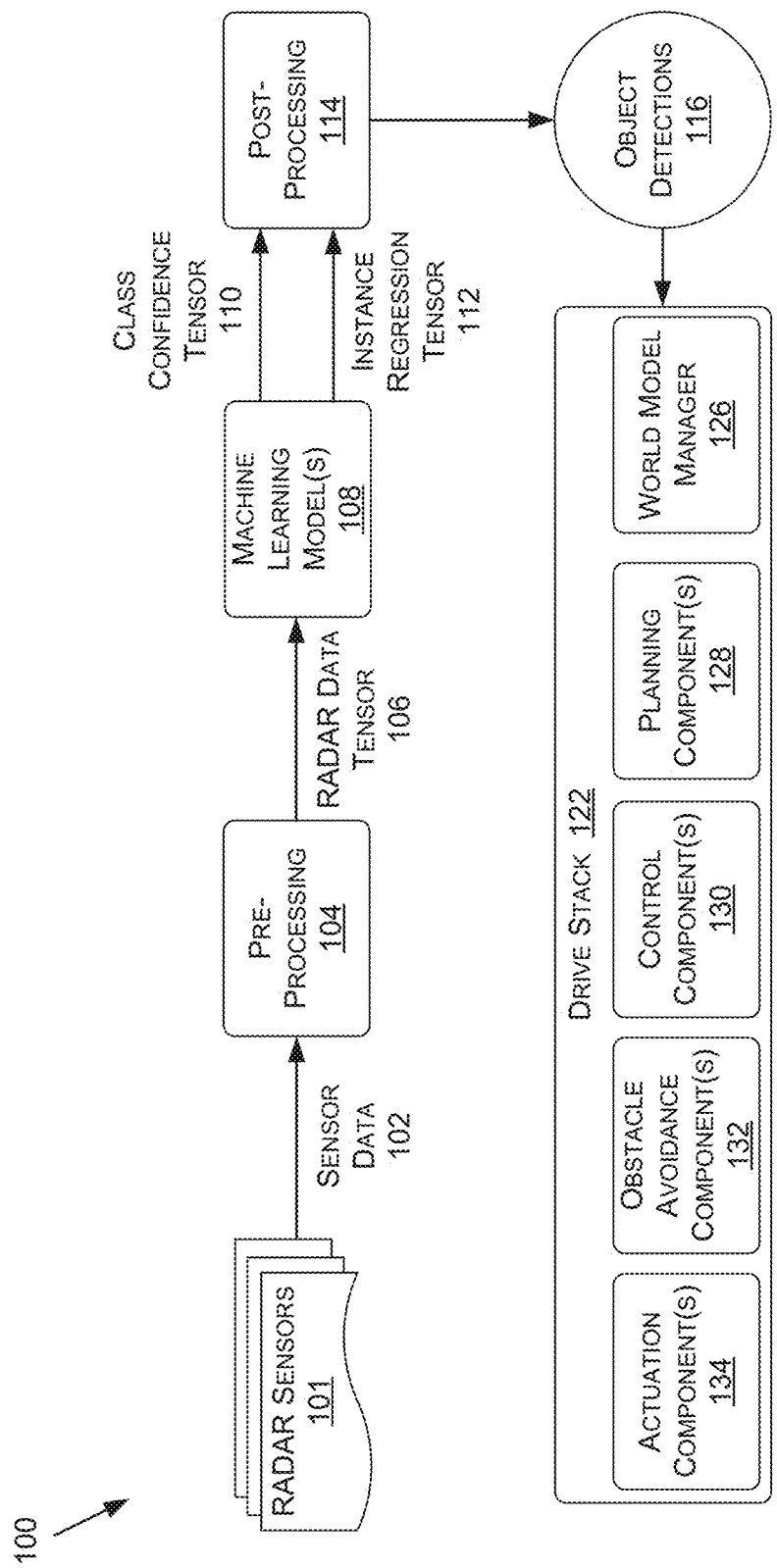
FIG. 1 is a data flow diagram illustrating an example process for an object detection system, in accordance with some embodiments of the present disclosure.

Systems and methods are disclosed relating to object detection for autonomous machines using deep neural networks (DNNs). Systems and methods are disclosed that use object detection techniques to identify or detect instances of moving or stationary obstacles (e.g., cars, trucks, pedestrians, cyclists, etc.) and other objects within environments for use by autonomous vehicles, semi-autonomous vehicles, robots, and/or other object types. Although the present disclosure may be described with respect to an example autonomous vehicle 1300 (alternatively referred to herein as "vehicle 1300" or "ego-vehicle 1300," an example of which is described herein with respect to FIGS. 13A-13D), this is not intended to be limiting. For example, the systems and methods described herein may be used by non-autonomous vehicles, semi-autonomous vehicles (e.g., in one or more advanced driver assistance systems (ADAS)), robots, warehouse vehicles, off-road vehicles, flying vessels, boats, and/or other vehicle types. In addition, although the present disclosure may be described with respect to autonomous driving, this is not intended to be limiting. For example, the systems and methods described herein may be used in robotics (e.g., path planning for a robot), aerial systems (e.g., path planning for a drone or other aerial vehicle), boating systems (e.g., path planning for a boat or other water vessel), and/or other technology areas, such as for localization, path planning, and/or other processes.

At a high level, a DNN (e.g., a convolutional neural network (CNN)) may be trained to detect moving and stationary obstacles using RADAR data of a three dimensional (3D) space, in both highway and urban scenarios. To form the input into the DNN, raw RADAR detections of an environment around an ego-object or ego-actor—such as a moving vehicle—may be pre-processed into a format that the DNN understands. In particular, RADAR detections may be accumulated, transformed to a single coordinate system (e.g., centered around the ego-actor), ego-motion-compensated (e.g., to a latest known position of the ego-actor), and/or orthographically projected to form a projection image (e.g., an overhead image) of a desired size (e.g., spatial dimension) and with a desired ground sampling distance. For each pixel on the projection image where one or more detections land, a set of features may be calculated or determined from reflection characteristics of the RADAR detection(s) (e.g., bearing, azimuth, elevation, range, intensity, Doppler velocity, RADAR cross section (RCS), reflectivity, signal-to-noise ratio (SNR), etc.). When there are multiple detections landing on (e.g., intersecting) a pixel, a particular feature may be calculated by aggregating a corresponding reflection characteristic for the multiple overlapping detections (e.g., using standard deviation, average, etc.). Thus, any given pixel may have multiple associated features values, which may be stored in corresponding channels of a tensor. As such, RADAR detections may be pre-processed into a multi-channel RADAR data tensor of a desired size, where each pixel of the projection image contained therein may include an associated set of feature values generated from accumulated and/or ego-motion-compensated RADAR detections. This RADAR data tensor may serve as the input into the DNN.

The architecture of the DNN may enable features to be extracted from the RADAR data tensor, and may enable class segmentation and/or instance regression to be executed on the extracted features. For example, the DNN may include a common trunk (or stream of layers) with several heads (or at least partially discrete streams of layers) for predicting different outputs based on the input data. The common trunk may be implemented using encoder and decoder components with skip connections, in embodiments (e.g., similar to a Feature Pyramid Network, U-Net, etc.). The output of the common trunk may be connected to a class confidence head and/or an instance regression head. The class confidence head may include a channel (e.g., classifier) for each class of object to be detected (e.g., vehicles, cars, trucks, vulnerable road users, pedestrians, cyclists, motorbikes, etc.), such that the class confidence head serves to predict classification data—such as a confidence map—in the form of a multi-channel tensor. Each channel may be thought of as a heat map with confidence/probability values that each pixel belongs to the class corresponding to the channel. The instance regression head may include N channels (e.g., classifiers), where each channel regresses a particular type of information about a detected object, such as where the object is located (e.g., dx/dy vector pointing to center of the object), object height, object width, object orientation (e.g., rotation angle such as sine and/or cosine), and/or the like. Thus, the instance regression head may serve to predict a multi-channel instance regression tensor storing N types of object information. Each channel of the instance regression tensor may include floating point numbers that regress a particular type of object information such as a particular object dimension. By way of nonlimiting example, each pixel of the instance regression tensor may have values for <dx,dy,w,h,sin O,cos O, etc.>. As such, the DNN may predict a multi-channel class confidence tensor and/or a multi-channel instance regression tensor from a given RADAR data tensor.

The predicted class confidence tensor and instance regression tensor may be used to generate bounding boxes, closed polylines, or other bounding shapes identifying the locations, sizes, and/or orientations of detected object instances in the scene depicted in a projection image. Since the object instance data may be noisy, bounding shapes may be generated using non-maximum suppression, density-based spatial clustering of application with noise (DBSCAN), and/or another function. By way of non-limiting example, candidate bounding boxes (or other bounding shapes) may be formed for a given object class based on object instance data (e.g., location, dimensions such as size, pose, and/or orientation data) from the corresponding channels of the instance regression tensor and/or from the confidence map from a corresponding channel of the class confidence tensor for that class. The result may be a set of candidate bounding boxes (or other bounding shapes) for each object class.

Various types of filtering may be performed to remove certain candidates. For example, each candidate may be associated with a corresponding confidence/probability value associated with one or more corresponding pixels from a corresponding channel of the class confidence tensor for the class being evaluated (e.g., using the confidence/probability value of a representative pixel such as a center pixel, using an averaged or some other composite value computed over the candidate region, etc.). Thus, candidate bounding shapes that have a confidence/probability of being a member of the object class less than some threshold (e.g., 50%) may be filtered out. The candidate with the highest confidence/probability score for the class may be assigned an instance ID, a metric such as intersection over union (IoU) may be calculated with respect to each of the other candidates in the class, and candidates having an IoU above some threshold may be filtered out to remove duplicates. The process may be repeated, assigning the candidate having the next highest confidence/probability score an instance ID, removing duplicates, and repeating until there are no more candidates remaining. The process may be repeated for each of the other classes. Additionally and/or alternatively, clustering may be performed on the candidate bounding shapes, for example, by clustering the centers of the candidate bounding shapes and removing duplicate candidates from each cluster.

As such, post-processing may be applied to a predicted class confidence tensor and instance regression tensor to generate bounding boxes, closed polylines, or other bounding shapes identifying the locations, size, and/or orientations of the detected object instances in the scene depicted in a corresponding projection image. Once the object instances have been determined, the 2D pixel coordinates defining the object instances may be converted to 3D world coordinates (e.g., by reprojecting detection object instances from the 2D orthographic projection back to 3D world coordinates) for use by the autonomous vehicle in performing one or more operations (e.g., lane keeping, lane changing, path planning, mapping, etc.).

To train the DNN, training data may be generated using the pre-processing technique described above. However, given how sparse RADAR data may be, it is often challenging to distinguish objects such as vehicles in the RADAR data alone. As such, in some embodiments, ground truth data may be generated from LIDAR data or other sources of 3D information such as stereo cameras, structure from motion depth estimation, ultrasound, and/or the like. More specifically, a scene may be observed with RADAR and LIDAR sensors to collect a frame of RADAR data and LIDAR data for a particular time slice. The RADAR data may be used to generate an input RADAR data tensor, and the LIDAR data associated with the same or closest time slice as the RADAR data may be used to generate ground truth labels, which may be used to generate ground truth class segmentation and/or instance regression tensors. More specifically, a LIDAR point cloud may be orthographically projected to form a LIDAR projection image (e.g., an overhead image) corresponding to the RADAR projection image contained in the RADAR data tensor (e.g., having the same size, perspective, and/or ground sampling distance). The LIDAR projection image may be annotated (e.g., manually, automatically, etc.) with labels identifying the locations, sizes, orientations, and/or classes of the instances of the relevant objects in the LIDAR projection image. The LIDAR labels may comprise bounding boxes, closed polylines, or other bounding shapes drawn, annotated, superimposed, and/or otherwise associated with the LIDAR projection image.

The LIDAR labels may be used to generate a corresponding class confidence tensor and instance regression tensor that may serve as ground truth data for the DNN. In some embodiments, the LIDAR labels may be propagated to a RADAR projection image for a closest frame of RADAR data (e.g., associated with the same time slice), the number of RADAR detections each LIDAR label contains may be determined, and LIDAR labels containing less than some threshold number of RADAR detections may be omitted. The (remaining) LIDAR labels may be used to generate ground truth data. For example, the location, size, orientation, and/or class of each of the (remaining) LIDAR labels may be used to generate a confidence map matching the size and dimensionality of the class confidence tensor. By way of non-limiting example, for a given class and a corresponding dimension of the class confidence tensor, pixel values for pixels falling within each labeled bounding shape for that class may be set to a value indicating a positive classification (e.g., 1). Additionally or alternatively, the location, size, orientation, and/or class of each of the (remaining) LIDAR labels may be used to generate object information matching the size and dimensionality of the instance regression tensor. For example, for each pixel contained with the LIDAR label, the LIDAR label may be used to compute corresponding location, size, and/or orientation information. Orientation information may include, for example and without limitation, information related to: where the object is located (e.g., for an object center) relative to each pixel, an object height, an object width, an object orientation (e.g., rotation angles relative to the orientation of the projection image), and/or the like. The computed object information may be stored in a corresponding channel of the instance regression tensor. Thus, LIDAR labels may be used to generate ground truth class segmentation and/or instance regression tensors.

As such, the training data may be used to train the DNN to detect moving and stationary obstacles and other objects from RADAR data, and the object detections may be provided to an autonomous vehicle drive stack to enable safe planning and control of the autonomous vehicle. Unlike conventional approaches, the present techniques may be used to distinguish between stationary obstacles—such as cars—and stationary background noise, which is particularly important when navigating in a cluttered urban environment. Further, embodiments of the present disclosure may provide a simple and effective way to regress dimensions and orientations of these obstacles, where conventional methods struggle or fail entirely. Moreover, since embodiments of the present disclosure may rely on RADAR data in operation, object detections may be performed in inclement weather and at night, in situations where camera-based and LIDAR-based detection techniques degrade and fail.

Example Object Detection System

With reference to FIG. 1, FIG. 1 is a data flow diagram illustrating an example process for an object detection system, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, the process 100 may include one or more machine learning models 108 configured to detect objects such as instances of obstacles from sensor data 102 such as RADAR detections generated from RADAR sensors 101. The sensor data 102 may be pre-processed 104 into input data with a format that machine learning model(s) 108 understands—such as a RADAR data tensor 106—and the input data may be fed into machine learning model(s) 108 to detect objects 116 represented in the input data. In some embodiments, machine learning model(s) 108 predicts a class confidence tensor 110 and an instance regression tensor 112, which may be post-processed 114 into object detections 116 comprising bounding boxes, closed polylines, or other bounding shapes identifying the locations, sizes, and/or orientations of the detected objects. These object detections 116 may correspond to obstacles around an autonomous vehicle, and may be used by control component(s) of the autonomous vehicle (e.g., controller(s) 1336, ADAS system 1338, SOC(s) 1304, software stack 122, and/or other components of the autonomous vehicle 1300 of FIGS. 13A-13D) to aid the autonomous vehicle in performing one or more operations (e.g., obstacle avoidance, path planning, mapping, etc.) within an environment.

In embodiments where the sensor data 102 includes RADAR data, the RADAR data may be captured with respect to a three dimensional (3D) space. For example, one or more RADAR sensors 101 of an ego-object or ego-actor—such as RADAR sensor(s) 1360 of the autonomous vehicle 1300 of FIGS. 13A-13D—may be used to generate RADAR detections of objects in an environment around the vehicle. Generally, a RADAR system may include a transmitter that emits radio waves. The radio waves reflect off of certain objects and materials, and one of the RADAR sensor(s) 101 may detect these reflections and reflection characteristics such as bearing, azimuth, elevation, range (e.g., time of beam flight), intensity, Doppler velocity, RADAR cross section (RCS), reflectivity, SNR, and/or the like. Reflections and reflection characteristics may depend on the objects in the environment, speeds, materials, sensor mounting position and orientation, etc. Firmware associated with the RADAR sensor(s) 101 may be used to control RADAR sensor(s) 101 to capture and/or process sensor data 102, such as reflection data from the sensor's field of view. Generally, sensor data 102 may include raw sensor data, RADAR point cloud data, and/or reflection data processed into some other format. For example, reflection data may be combined with position and orientation data (e.g., from GNSS and IMU sensors) to form a point cloud representing detected reflections from the environment. Each detection in the point cloud may include a three dimensional location of the detection and metadata about the detection such as one or more of the reflection characteristics.

Sensor data 102 may be pre-processed 104 into a format that machine learning model(s) 108 understands. For example, in embodiments where sensor data 102 includes RADAR detections, the RADAR detections may be accumulated, transformed to a single coordinate system (e.g., centered around the ego-actor/vehicle), ego-motion-compensated (e.g., to a latest known position of the ego-actor/vehicle), and/or orthographically projected to form a projection image (e.g., an overhead image) of a desired size (e.g., spatial dimension) and with a desired ground sampling distance. The projection image and/or other reflection data may be stored and/or encoded into a suitable representation, such as a RADAR data tensor 106, which may serve as the input into machine learning model(s) 108.

Figure 2:
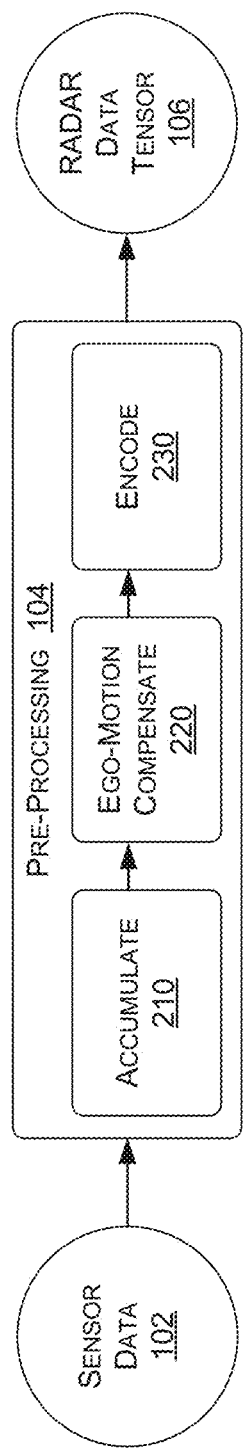
FIG. 2 is a data flow diagram illustrating an example process for pre-processing sensor data for machine learning model(s) in an object detection system, in accordance with some embodiments of the present disclosure.

FIG. 2 is a data flow diagram illustrating an example process for pre-processing 104 sensor data 102 for machine learning model(s) 108 in an object detection system, in accordance with some embodiments of the present disclosure. In this example, sensor data 102 may include RADAR detections, which may be accumulated 210 (which may include transforming to a single coordinate system), ego-motion-compensated 220, and/or encoded 230 into a suitable representation such as a projection image of the RADAR detections, with multiple channels storing different reflection characteristics.

More specifically, sensor detections such as RADAR detections may be accumulated 210 from multiple sensors, such as some or all the surrounding RADAR sensor(s) 1360 from different locations of the autonomous vehicle 1300, and may be transformed to a single vehicle coordinate system (e.g., centered around the vehicle). Additionally or alternatively, the sensor detections may be accumulated 210 over time in order to increase the density of the accumulated sensor data. Sensor detections may be accumulated over any desired window of time (e.g., 0.5 seconds (s), 1 s, 2 s, etc.). The size of the window may be selected based on the sensor and/or application (e.g., smaller windows may be selected for noisy applications such as highway scenarios). As such, each input into machine learning model(s) 108 may be generated from accumulated detections from each window of time from a rolling window (e.g., from a duration spanning from t-window size to present). Each window to evaluate may be incremented by any suitable step size, which may but need not correspond to the window size.

Thus, each successive input into machine learning model(s) 108 may be based on successive windows, which may but need not be overlapping.

In some embodiments, ego-motion-compensation 220 may be applied to the sensor detections. For example, accumulated detections may be ego-motion-compensated to the latest known vehicle position. More specifically, locations of older detections may be propagated to a latest known position of the moving vehicle, using the known motion of the vehicle to estimate where the older detections will be located (e.g., relative to the present location of the vehicle) at a desired point in time (e.g., the current point in time). The result may be a set of accumulated, ego-motion compensated detections (e.g., RADAR detections) for a particular time slice.

In some embodiments, the (accumulated, ego-motion compensated) RADAR detections may be encoded 230 into a suitable representation such as a projection image, which may include multiple channels storing different features such as reflection characteristics. More specifically, accumulated, ego-motion compensated detections may be orthographically projected to form a projection image of a desired size (e.g., spatial dimension) and with a desired ground sampling distance. Any desired view of the environment may be selected for the projection image, such as a top down view, a front view, a perspective view, and/or others. In some embodiments, multiple projection images with different views may be generated, with each projection image being input into a separate channel of machine learning model(s) 108. Since a projection image may be evaluated as an input to the machine learning model(s) 108, there is generally a tradeoff between prediction accuracy and computational demand. As such, a desired spatial dimension and ground sampling distance (e.g., meters per pixel) for the projection image may be selected as a design choice.

In some embodiments, a projection image may include multiple layers, with pixel values for the different layers storing different reflection characteristics. In some embodiments, for each pixel on the projection image where one or more detections land, a set of features may be calculated, determined, or otherwise selected from the reflection characteristics of the RADAR detection(s) (e.g., bearing, azimuth, elevation, range, intensity, Doppler velocity, RADAR cross section (RCS), reflectivity, signal-to-noise ratio (SNR), etc.). When there are multiple detections landing on a pixel, thereby forming a tower of points, a particular feature for that pixel may be calculated by aggregating a corresponding reflection characteristic for the multiple overlapping detections (e.g., using standard deviation, average, etc.). Thus, any given pixel may have multiple associated features values, which may be stored in corresponding channels of a RADAR data tensor 106. As such, a RADAR data tensor 106 may serve as the input into machine learning model(s) 108.

Figure 3:
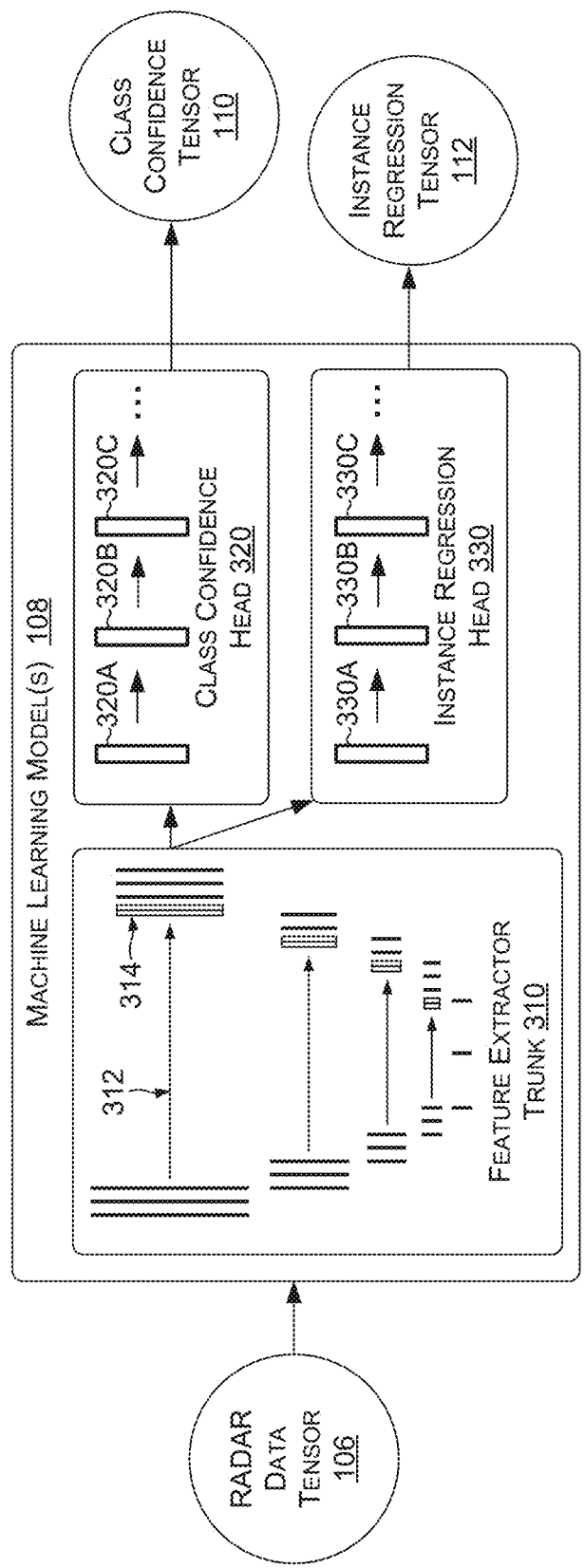
FIG. 3 is an illustration of example machine learning model(s), in accordance with some embodiments of the present disclosure.

Turning now to FIG. 3, FIG. 3 is an illustration of an example implementation of machine learning model(s) 108, in accordance with some embodiments of the present disclosure. At a high level, machine learning model(s) 108 may accept sensor data (e.g., RADAR data processed into RADAR data tensor 106) as an input to detect objects such as instances of obstacles represented in the sensor data. In a non-limiting example, machine learning model(s) 108 may take as input a projection image of accumulated, ego-motion compensated, and orthographically projected RADAR detections, where any given pixel may store various reflection characteristics of the RADAR detections in corresponding channels of an input tensor (e.g., RADAR data tensor 106). In order to detect objects from the input, machine learning model(s) 108 may predict classification data (e.g., class confidence tensor 110) and/or object instance data such as location, size, and/or orientation data for each class (e.g., instance regression tensor 112). The classification data and object instance data may be post-processed to generate bounding boxes, closed polylines, or other bounding shapes identifying the locations, sizes, and/or orientations of the detected object instances.

In some embodiments, machine learning model(s) 108 may be implemented using a DNN, such as a convolutional neural network (CNN). Although certain embodiments are described with machine learning model(s) 108 being implemented using neural network(s), and specifically CNN(s), this is not intended to be limiting. For example, and without limitation, machine learning model(s) 108 may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Generally, machine learning model(s) 108 may include a common trunk (or stream of layers) with several heads (or at least partially discrete streams of layers) for predicting different outputs based on the input data. For example, machine learning model(s) 108 may include, without limitation, a feature extractor including convolutional layers, pooling layers, and/or other layer types, where the output of the feature extractor is provided as input to a first head for predicting classification data and a second head for predicting location, size, and/or orientation of detected objects. The first head and the second head may receive parallel inputs, in some examples, and thus may produce different outputs from similar input data. In the example of FIG. 3, machine learning model(s) 108 is illustrated with an example architecture that extracts features from RADAR data tensor 106 and executes class segmentation and/or instance regression on the extracted features. More specifically, machine learning model(s) 108 of FIG. 3 includes feature extractor trunk 310, class confidence head 320, and instance regression head 330.

Feature extractor trunk 310 may be implemented using encoder and decoder components with skip connections (e.g., similar to a Feature Pyramid Network, U-Net, etc.). For example, feature extractor trunk 310 may accept input data such as RADAR data tensor 106 and apply various convolutions, pooling, and/or other types of operations to extract features into some latent space. In FIG. 3, feature extractor trunk 310 is illustrated with an example implementation involving an encoder/decoder with an encoding (contracting) path down the left side and an example decoding (expansive) path up the right. Along the contracting path, each resolution may include any number of layers (e.g., convolutions, dilated convolutions, inception blocks, etc.) and a downampling operation (e.g., max pooling). Along the expansive path, each resolution may include any number of layers (e.g., deconvolutions, upsampling followed by convolution(s), and/or other types of operations). In the expansive path, each resolution of a feature map may be upsampled and concatenated (e.g., in the depth dimension) with feature maps of the same resolution from the contracting path. In this example, corresponding resolutions of the contracting and expansive paths may be connected with skip connections (e.g., skip connection 312), which may be used to add or concatenate feature maps from corresponding resolutions (e.g., forming concatenated feature map 314). As such, feature extractor trunk 310 may extract features into some latent space tensor, which may be input into class confidence head 320 and instance regression head 330.

Class confidence head 320 may include any number of layers 320A, 320B, 320C (e.g., convolutions, pooling, classifiers such as softmax, and/or other types of operations, etc.) that predict classification data from the output of feature extractor trunk 310. For example, class confidence head 320 may include a channel (e.g., a stream of layers plus a classifier) for each class of object to be detected (e.g., vehicles, cars, trucks, vulnerable road users, pedestrians, cyclists, motorbikes, etc.), such that class confidence head 320 serves to predict classification data—such as a confidence map—in the form of a multi-channel tensor (e.g., class confidence tensor 110). Each channel may be thought of as a heat map with confidence/probability values that each pixel belongs to the class corresponding to the channel.

Instance regression head 330 may include any number of layers 330A, 330B, 330C (e.g., convolutions, pooling, classifiers such as softmax, and/or other types of operations, etc.) that predict object instance data (such as location, size, and/or orientation of detected objects) from the output of feature extractor trunk 310. Instance regression head 330 may include N channels (e.g., streams of layers plus a classifier), where each channel regresses a particular type of information about a detected object instance of the class, such as where the object is located (e.g., dx/dy vector pointing to center of the object), object height, object width, object orientation (e.g., rotation angle such as sine and/or cosine), and/or the like. By way of non-limiting example, instance regression head 330 may include separate dimensions identifying the x-dimension of the center of a detected object, the y-dimension of the center of a detected object, the width of a detected object, the height of a detected object, the sine of the orientation of a detected objected (e.g., a rotation angle in 2D image space), the cosine of the orientation of a detected object, and/or other types of information. These types of object instance data are meant merely as an example, and other types of object information may be regressed within the scope of the present disclosure. Thus, the instance regression head 330 may serve to predict a multi-channel instance regression tensor (e.g., instance regression tensor 112) storing N types of object information. Each channel of instance regression tensor 112 may include floating-point numbers that regress a particular type of object information such as a particular object dimension.

As such, machine learning model(s) 108 may predict multi-channel classification data (e.g., class confidence tensor 110) and/or multi-channel object instance data (e.g., instance regression tensor 112) from a particular input (e.g., RADAR data tensor 106). Some possible training techniques are described in more detail below. In operation, the outputs of machine learning model(s) 108 may be post-processed (e.g., decoded) to generate bounding boxes, closed polylines, or other bounding shapes identifying the locations, sizes, and/or orientations of the detected object instances, as explained in more detail below. Additionally or alternatively to machine learning model(s) 108 using a common trunk with separate segmentation heads, separate DNN featurizers may be configured to evaluate projection images from different views of the environment. In one example, multiple projection images may be generated with different views, each projection image may be fed into separate side-by-size DNN featurizers, and the latent space tensors of the DNN featurizers may be combined and decoded into object detections (e.g., bounding boxes, closed polylines, or other bounding shapes). In another example, sequential DNN featurizers may be chained. In this example, a first projection image may be generated with a first view of the environment (e.g., a perspective view), the first projection image may be fed into a first DNN featurizer (e.g., that predicts classification data), the output of the first DNN featurizer may be transformed to a second view of the environment (e.g., a top down view), which may be fed into a second DNN featurizer (e.g., that predicts object instance data). These architectures are meant simply as examples, and other architectures (whether single-view or multi-view scenarios with separate DNN featurizers) are contemplated within the scope of the present disclosure.

As explained above, the outputs of machine learning model(s) 108 may be post-processed (e.g., decoded) to generate bounding boxes, closed polylines, or other bounding shapes identifying the locations, sizes, and/or orientations of detected object instances. For example, when the input into machine learning model(s) 108 includes a projection image (e.g., of accumulated, ego-motion compensated, and orthographically projected RADAR detections), the bounding boxes, closed polylines, or other bounding shapes may be identified with respect to the projection image (e.g., in the image space of the projection image). In some embodiments, since the object instance data may be noisy and/or may produce multiple candidates, bounding shapes may be generated using non-maximum suppression, density-based spatial clustering of application with noise (DBSCAN), and/or another function.

Figure 4:
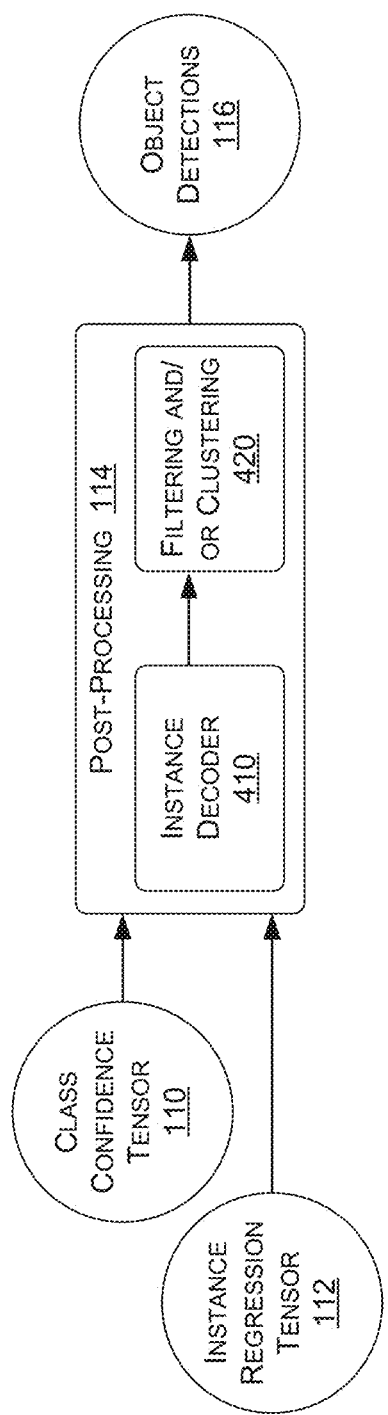
FIG. 4 is a data flow diagram illustrating an example post-processing process for generating object detections in an object detection system, in accordance with some embodiments of the present disclosure.

FIG. 4 is a data flow diagram illustrating an example post-processing process 114 for generating object detections 116 in an object detection system, in accordance with some embodiments of the present disclosure. In this example, the post-processing process 114 includes an instance decoder 140 and filtering and/or clustering 420. Generally, the instance decoder 140 may identify candidate bounding boxes (or other bounding shapes) (e.g., for each object class) based on object instance data (e.g., location, size, and/or orientation data) from the corresponding channels of an instance regression tensor 112 and/or the confidence map from a corresponding channel of a class confidence tensor 110 for that class. More specifically, a predicted confidence map and predicted object instance data may specify information about detected object instances, such as where the object is located, object height, object width, object orientation, and/or the like. This information may be used to identify candidate object detections (e.g., candidates having a unique center point, object height, object width, object orientation, and/or the like). The result may be a set of candidate bounding boxes (or other bounding shapes) for each object class.

Various types of filtering and/or clustering 420 may be applied to remove duplication and/or noise from the candidate bounding boxes (or other bounding shapes) for each object class. For example, in some embodiments, duplicates may be removed using non-maximum suppression. Non-maximum suppression may be used where two or more candidate bounding boxes have associated confidence values that indicate the candidate bounding boxes may correspond to the same object instance. In such examples, the confidence value that is the highest for the object instance may be used to determine which candidate bounding box to use for that object instance, and non-maximum suppression may be used to remove, or suppress, the other candidates.

For example, each candidate bounding box (or other bounding shape) may be associated with a corresponding confidence/probability value associated with one or more corresponding pixels from a corresponding channel of the class confidence tensor 110 for the class being evaluated (e.g., using the confidence/probability value of a representative pixel such as a center pixel, using an averaged or some other composite value computed over the candidate region, etc.). Thus, candidate bounding shapes that have a confidence/probability of being a member of the object class less than some threshold (e.g., 50%) may be filtered out. Additionally or alternatively, a candidate bounding box (or other shape) with the highest confidence/probability score for a particular class may be assigned an instance ID, a metric such as intersection over union (IoU) may be calculated with respect to each of the other candidates in the class, and candidates having an IoU above some threshold may be filtered out to remove duplicates. The process may be repeated, assigning the candidate having the next highest confidence/probability score an instance ID, removing duplicates, and repeating until there are no more candidates remaining. The process may be repeated for each of the other classes to remove duplicate candidates.

In some embodiments, a clustering approach such as density-based spatial clustering of applications with noise (DBSCAN) may be used to remove duplicate candidate bounding shapes. For example, candidate bounding shapes may be clustered (e.g., the centers of the candidate bounding shapes may be clustered), candidates in each cluster may be determined to correspond to the same object instance, and duplicate candidates from each cluster may be removed.

Figure 5B:
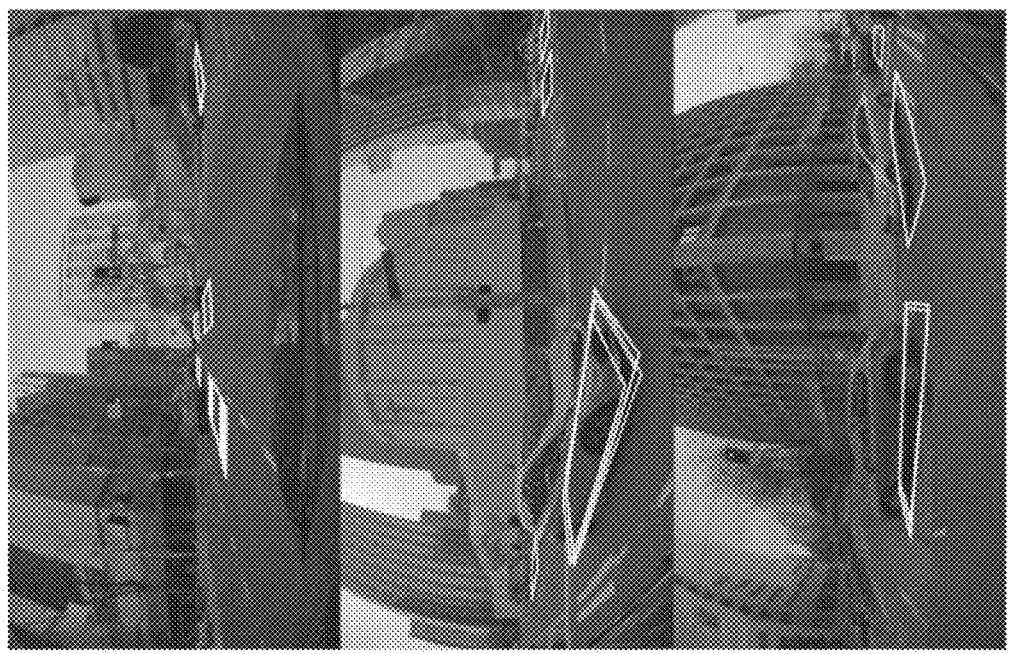
FIG. 5B is an illustration of the object detections projected into corresponding images from three cameras, in accordance with some embodiments of the present disclosure.
Figure 5A:
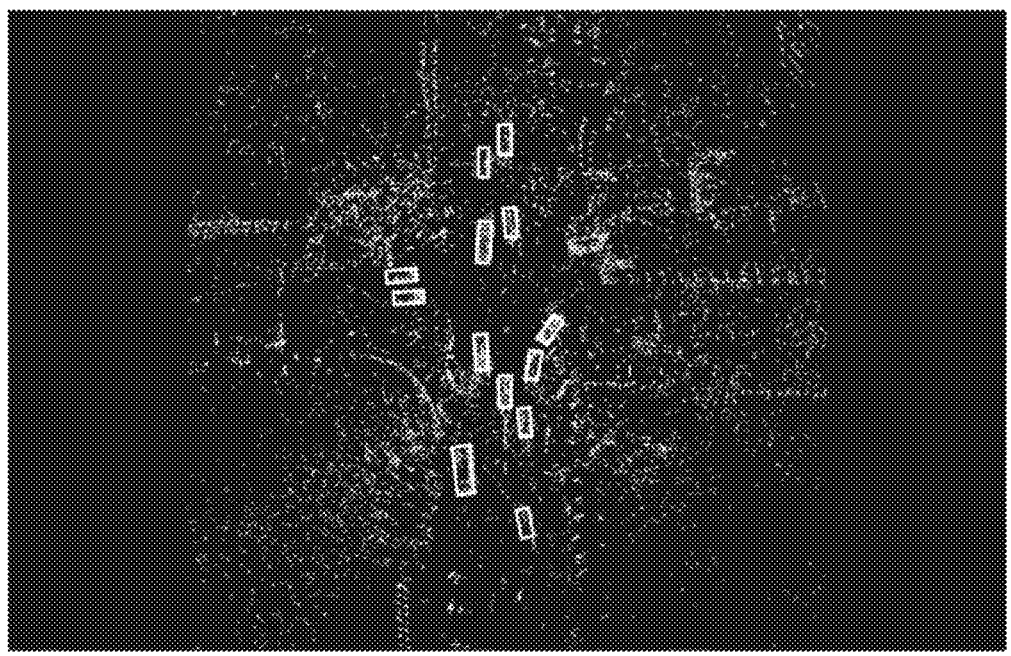
FIG. 5A is an illustration of an example orthographic projection of accumulated RADAR detections and corresponding object detections.

To summarize, machine learning model(s) 108 may accept sensor data such as a projection image (e.g., of accumulated, ego-motion compensated, and orthographically projected RADAR detections) and predict classification data and/or object instance data, which may be post-processed to generate bounding boxes, closed polylines, or other bounding shapes identifying the locations, sizes, and/or orientations of detected object instances in the projection image. FIG. 5A is an illustration of an example orthographic projection of accumulated RADAR detections and corresponding object detections (i.e., the white bounding boxes, in this example) in accordance with some embodiments of the present disclosure. For visualization purposes, FIG. 5B is an illustration of the object detections projected into corresponding images from three cameras.

Once the locations, size, and/or orientations of the object instances have been determined, 2D pixel coordinates defining the object instances may be converted to 3D world coordinates for use by the autonomous vehicle in performing one or more operations (e.g., obstacle avoidance, lane keeping, lane changing, path planning, mapping, etc.). More specifically and returning to FIG. 1, object detections 116 (e.g., bounding boxes, closed polylines, or other bounding shapes) may be used by control component(s) of the autonomous vehicle 1300 depicted in FIGS. 13A-13D, such as an autonomous driving software stack 122 executing on one or more components of the vehicle 1300 (e.g., the SoC(s) 1304, the CPU(s) 1318, the GPU(s) 1320, etc.). For example, the vehicle 1300 may use this information (e.g., instances of obstacles) to navigate, plan, or otherwise perform one or more operations (e.g. obstacle avoidance, lane keeping, lane changing, merging, splitting, etc.) within the environment.

In some embodiments, the object detections 116 may be used by one or more layers of the autonomous driving software stack 122 (alternatively referred to herein as "drive stack 122"). The drive stack 122 may include a sensor manager (not shown), perception component(s) (e.g., corresponding to a perception layer of the drive stack 122), a world model manager 126, planning component(s) 128 (e.g., corresponding to a planning layer of the drive stack 122), control component(s) 130 (e.g., corresponding to a control layer of the drive stack 122), obstacle avoidance component(s) 132 (e.g., corresponding to an obstacle or collision avoidance layer of the drive stack 122), actuation component(s) 134 (e.g., corresponding to an actuation layer of the drive stack 122), and/or other components corresponding to additional and/or alternative layers of the drive stack 122. The process 100 may, in some examples, be executed by the perception component(s), which may feed up the layers of the drive stack 122 to the world model manager, as described in more detail herein.

The sensor manager may manage and/or abstract the sensor data 102 from the sensors of the vehicle 1300. For example, and with reference to FIG. 13C, the sensor data 102 may be generated (e.g., perpetually, at intervals, based on certain conditions) by RADAR sensor(s) 1360. The sensor manager may receive the sensor data 102 from the sensors in different formats (e.g., sensors of the same type may output sensor data in different formats), and may be configured to convert the different formats to a uniform format (e.g., for each sensor of the same type). As a result, other components, features, and/or functionality of the autonomous vehicle 1300 may use the uniform format, thereby simplifying processing of the sensor data 102. In some examples, the sensor manager may use a uniform format to apply control back to the sensors of the vehicle 1300, such as to set frame rates or to perform gain control. The sensor manager may also update sensor packets or communications corresponding to the sensor data with time-stamps to help inform processing of the sensor data by various components, features, and functionality of an autonomous vehicle control system.

A world model manager 126 may be used to generate, update, and/or define a world model. The world model manager 126 may use information generated by and received from the perception component(s) of the drive stack 122 (e.g., the locations of detected obstacles). The perception component(s) may include an obstacle perceiver, a path perceiver, a wait perceiver, a map perceiver, and/or other perception component(s). For example, the world model may be defined, at least in part, based on affordances for obstacles, paths, and wait conditions that can be perceived in real-time or near real-time by the obstacle perceiver, the path perceiver, the wait perceiver, and/or the map perceiver. The world model manager 126 may continually update the world model based on newly generated and/or received inputs (e.g., data) from the obstacle perceiver, the path perceiver, the wait perceiver, the map perceiver, and/or other components of the autonomous vehicle control system.

The world model may be used to help inform planning component(s) 128, control component(s) 130, obstacle avoidance component(s) 132, and/or actuation component(s) 134 of the drive stack 122. The obstacle perceiver may perform obstacle perception that may be based on where the vehicle 1300 is allowed to drive or is capable of driving (e.g., based on the location of the drivable paths defined by avoiding detected obstacles), and how fast the vehicle 1300 can drive without colliding with an obstacle (e.g., an object, such as a structure, entity, vehicle, etc.) that is sensed by the sensors of the vehicle 1300 and/or machine learning model(s) 108.

The path perceiver may perform path perception, such as by perceiving nominal paths that are available in a particular situation. In some examples, the path perceiver may further take into account lane changes for path perception. A lane graph may represent the path or paths available to the vehicle 1300, and may be as simple as a single path on a highway on-ramp. In some examples, the lane graph may include paths to a desired lane and/or may indicate available changes down the highway (or other road type), or may include nearby lanes, lane changes, forks, turns, cloverleaf interchanges, merges, and/or other information.

The wait perceiver may be responsible to determining constraints on the vehicle 1300 as a result of rules, conventions, and/or practical considerations. For example, the rules, conventions, and/or practical considerations may be in relation to traffic lights, multi-way stops, yields, merges, toll booths, gates, police or other emergency personnel, road workers, stopped buses or other vehicles, one-way bridge arbitrations, ferry entrances, etc. Thus, the wait perceiver may be leveraged to identify potential obstacles and implement one or more controls (e.g., slowing down, coming to a stop, etc.) that may not have been possible relying solely on the obstacle perceiver.

The map perceiver may include a mechanism by which behaviors are discerned, and in some examples, to determine specific examples of what conventions are applied at a particular locale. For example, the map perceiver may determine, from data representing prior drives or trips, that at a certain intersection there are no U-turns between certain hours, that an electronic sign showing directionality of lanes changes depending on the time of day, that two traffic lights in close proximity (e.g., barely offset from one another) are associated with different roads, that in Rhode Island, the first car waiting to make a left turn at traffic light breaks the law by turning before oncoming traffic when the light turns green, and/or other information. The map perceiver may inform the vehicle 1300 of static or stationary infrastructure objects and obstacles. The map perceiver may also generate information for the wait perceiver and/or the path perceiver, for example, such as to determine which light at an intersection has to be green for the vehicle 1300 to take a particular path.

Figure 13A:
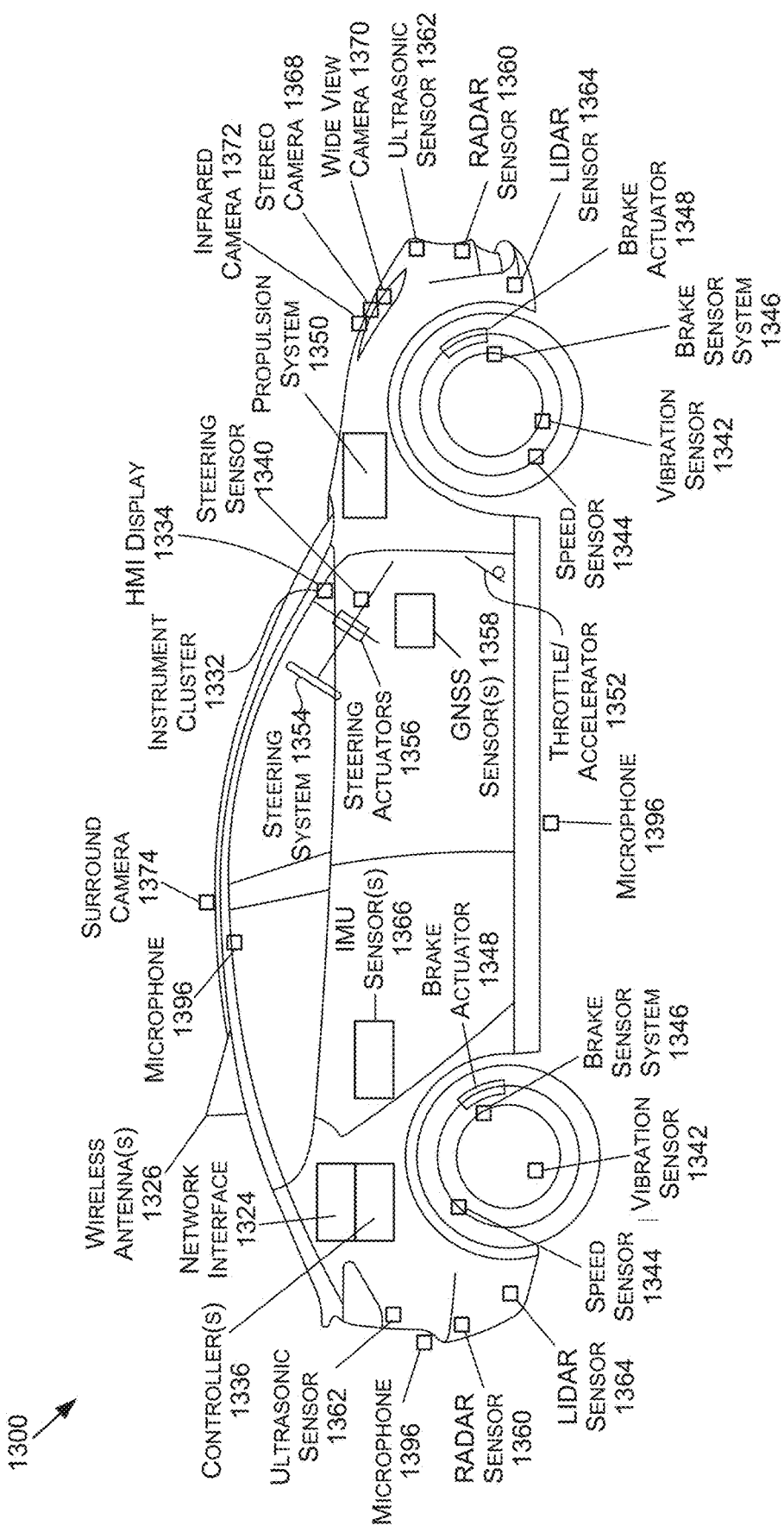
FIG. 13A is an illustration of an example autonomous vehicle, in accordance with some embodiments of the present disclosure.
Figure 13B:
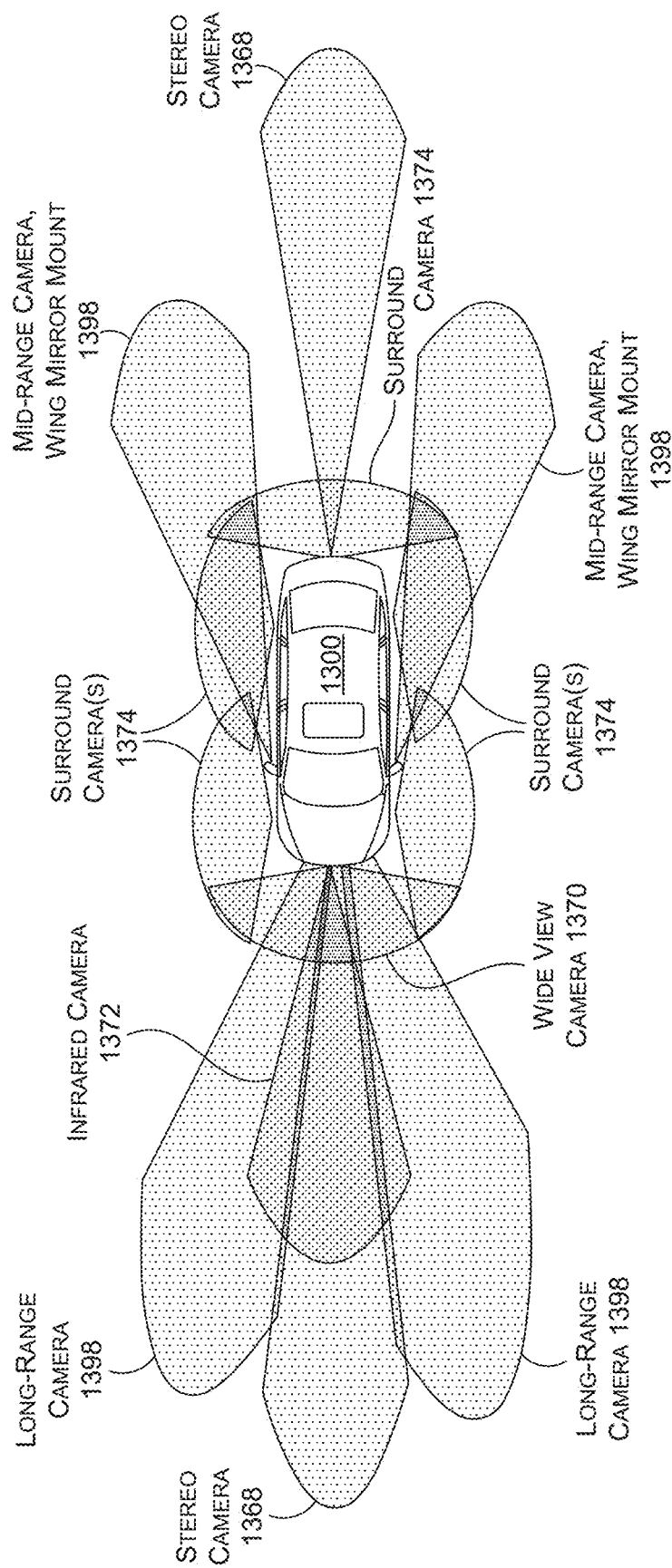
FIG. 13B is an example of camera locations and fields of view for the example autonomous vehicle of FIG. 13A, in accordance with some embodiments of the present disclosure.
Figure 13C:
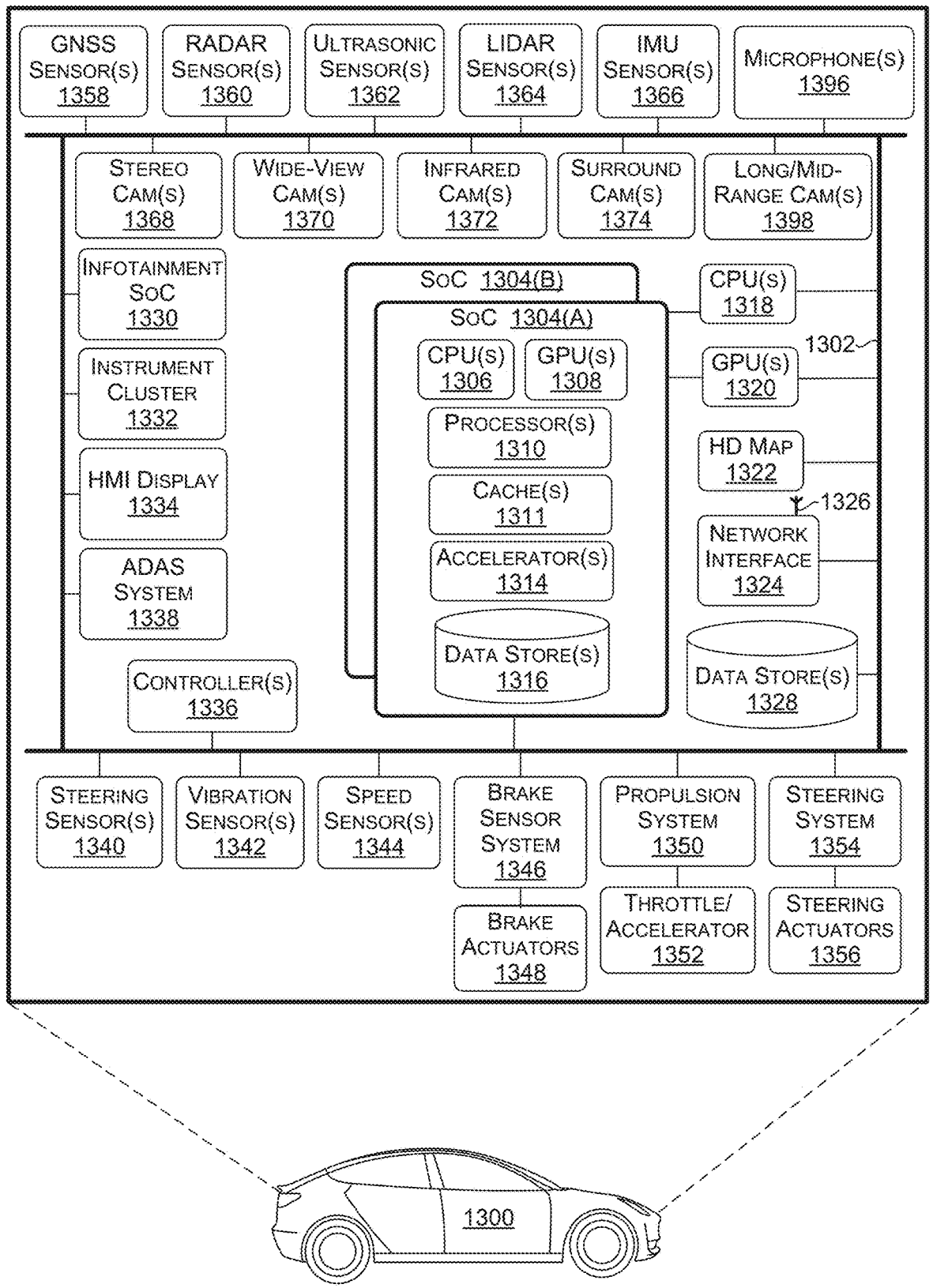
FIG. 13C is a block diagram of an example system architecture for the example autonomous vehicle of FIG. 13A, in accordance with some embodiments of the present disclosure.
Figure 13D:
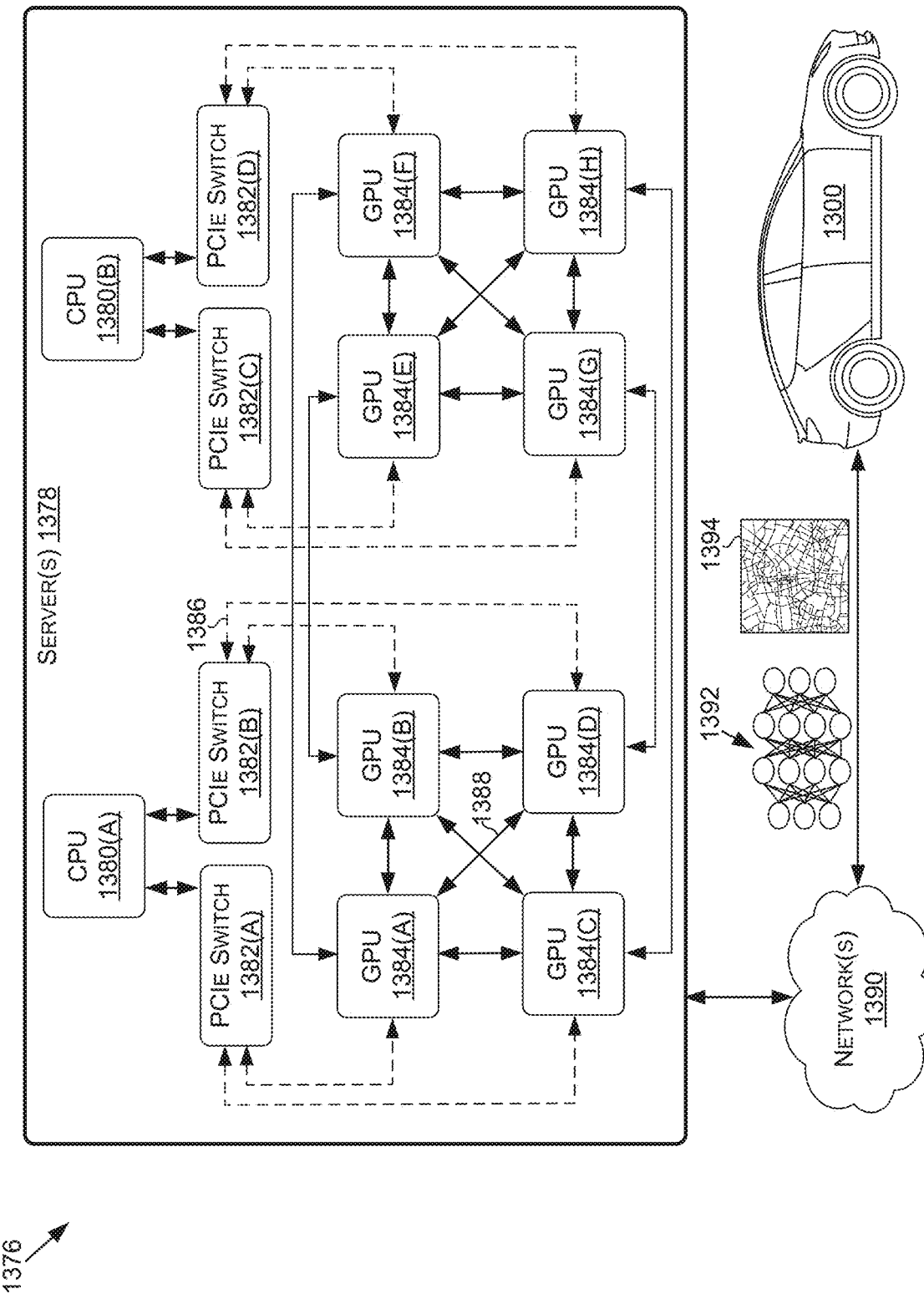
FIG. 13D is a system diagram for communication between cloud-based server(s) and the example autonomous vehicle of FIG. 13A, in accordance with some embodiments of the present disclosure.

In some examples, information from the map perceiver may be sent, transmitted, and/or provided to server(s) (e.g., to a map manager of server(s) 1378 of FIG. 13D), and information from the server(s) may be sent, transmitted, and/or provided to the map perceiver and/or a localization manager of the vehicle 1300. The map manager may include a cloud mapping application that is remotely located from the vehicle 1300 and accessible by the vehicle 1300 over one or more network(s). For example, the map perceiver and/or the localization manager of the vehicle 1300 may communicate with the map manager and/or one or more other components or features of the server(s) to inform the map perceiver and/or the localization manager of past and present drives or trips of the vehicle 1300, as well as past and present drives or trips of other vehicles. The map manager may provide mapping outputs (e.g., map data) that may be localized by the localization manager based on a particular location of the vehicle 1300, and the localized mapping outputs may be used by the world model manager 126 to generate and/or update the world model.

The planning component(s) 128 may include a route planner, a lane planner, a behavior planner, and a behavior selector, among other components, features, and/or functionality. The route planner may use the information from the map perceiver, the map manager, and/or the localization manger, among other information, to generate a planned path that may consist of GNSS waypoints (e.g., GPS waypoints), 3D world coordinates (e.g., Cartesian, polar, etc.) that indicate coordinates relative to an origin point on the vehicle 1300, etc. The waypoints may be representative of a specific distance into the future for the vehicle 1300, such as a number of city blocks, a number of kilometers, a number of feet, a number of inches, a number of miles, etc., that may be used as a target for the lane planner.

The lane planner may use the lane graph (e.g., the lane graph from the path perceiver), object poses within the lane graph (e.g., according to the localization manager), and/or a target point and direction at the distance into the future from the route planner as inputs. The target point and direction may be mapped to the best matching drivable point and direction in the lane graph (e.g., based on GNSS and/or compass direction). A graph search algorithm may then be executed on the lane graph from a current edge in the lane graph to find the shortest path to the target point.

The behavior planner may determine the feasibility of basic behaviors of the vehicle 1300, such as staying in the lane or changing lanes left or right, so that the feasible behaviors may be matched up with the most desired behaviors output from the lane planner. For example, if the desired behavior is determined to not be safe and/or available, a default behavior may be selected instead (e.g., default behavior may be to stay in lane when desired behavior or changing lanes is not safe).

The control component(s) 130 may follow a trajectory or path (lateral and longitudinal) that has been received from the behavior selector (e.g., based on object detections 116) of the planning component(s) 128 as closely as possible and within the capabilities of the vehicle 1300. The control component(s) 130 may use tight feedback to handle unplanned events or behaviors that are not modeled and/or anything that causes discrepancies from the ideal (e.g., unexpected delay). In some examples, the control component(s) 130 may use a forward prediction model that takes control as an input variable, and produces predictions that may be compared with the desired state (e.g., compared with the desired lateral and longitudinal path requested by the planning component(s) 128). The control(s) that minimize discrepancy may be determined.

Although the planning component(s) 128 and the control component(s) 130 are illustrated separately, this is not intended to be limiting. For example, in some embodiments, the delineation between the planning component(s) 128 and the control component(s) 130 may not be precisely defined. As such, at least some of the components, features, and/or functionality attributed to the planning component(s) 128 may be associated with the control component(s) 130, and vice versa. This may also hold true for any of the separately illustrated components of the drive stack 122.

The obstacle avoidance component(s) 132 may aid the autonomous vehicle 1300 in avoiding collisions with objects (e.g., moving and stationary objects). The obstacle avoidance component(s) 132 may include a computational mechanism at a "primal level" of obstacle avoidance, and may act as a "survival brain" or "reptile brain" for the vehicle 1300. In some examples, the obstacle avoidance component(s) 132 may be used independently of components, features, and/or functionality of the vehicle 1300 that is required to obey traffic rules and drive courteously. In such examples, the obstacle avoidance component(s) may ignore traffic laws, rules of the road, and courteous driving norms in order to ensure that collisions do not occur between the vehicle 1300 and any objects. As such, the obstacle avoidance layer may be a separate layer from the rules of the road layer, and the obstacle avoidance layer may ensure that the vehicle 1300 is only performing safe actions from an obstacle avoidance standpoint. The rules of the road layer, on the other hand, may ensure that vehicle obeys traffic laws and conventions, and observes lawful and conventional right of way (as described herein).

In some examples, the drivable paths and/or object detections 116 may be used by the obstacle avoidance component(s) 132 in determining controls or actions to take. For example, the drivable paths may provide an indication to the obstacle avoidance component(s) 132 of where the vehicle 1300 may maneuver without striking any objects, structures, and/or the like, or at least where no static structures may exist.

In non-limiting embodiments, the obstacle avoidance component(s) 132 may be implemented as a separate, discrete feature of the vehicle 1300. For example, the obstacle avoidance component(s) 132 may operate separately (e.g., in parallel with, prior to, and/or after) the planning layer, the control layer, the actuation layer, and/or other layers of the drive stack 122.

As such, the vehicle 1300 may use this information (e.g., as the edges, or rails of the paths) to navigate, plan, or otherwise perform one or more operations (e.g. lane keeping, lane changing, merging, splitting, etc.) within the environment.

Figure 6:
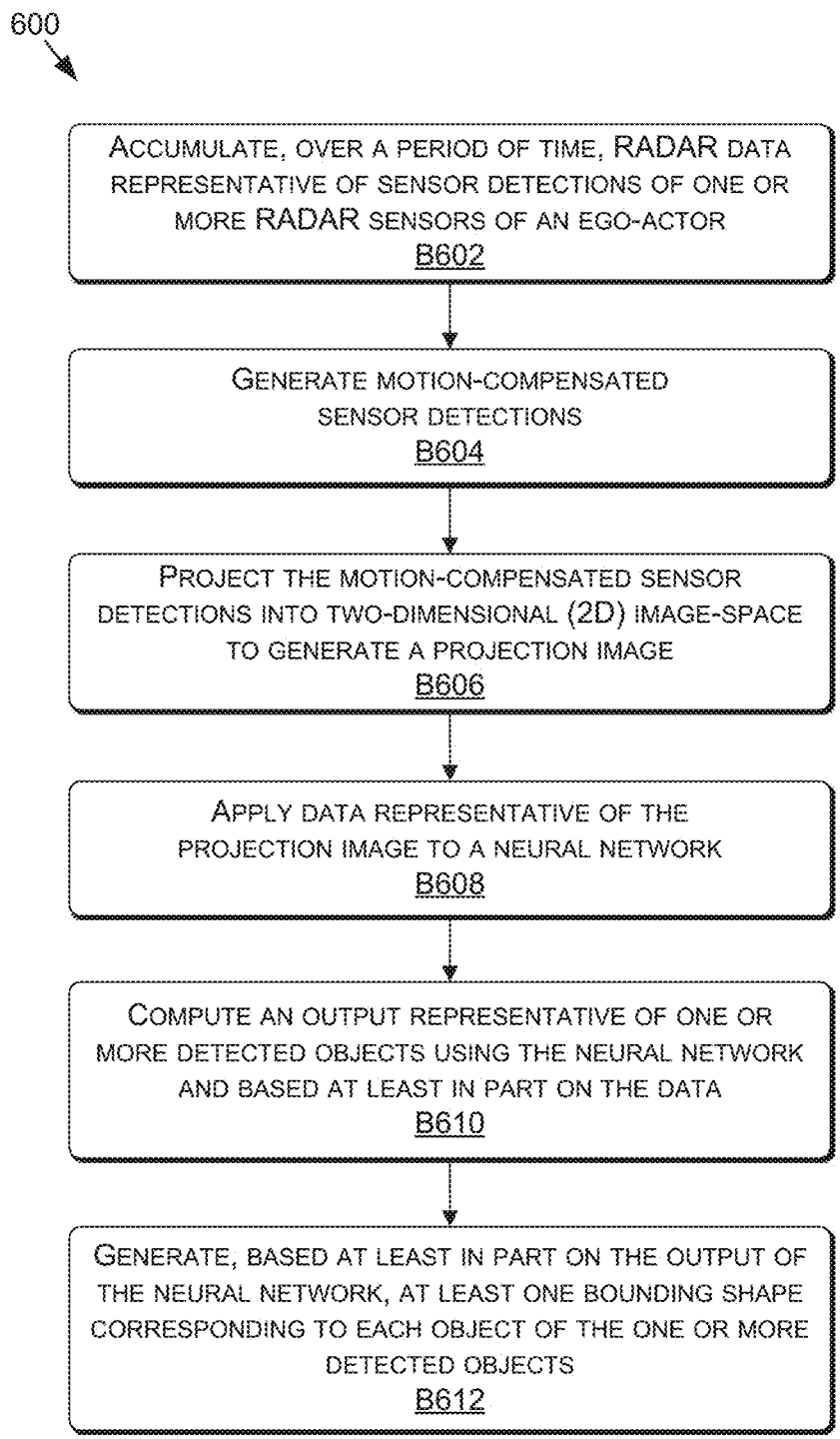
FIG. 6 is a flow diagram showing a method for object detection using RADAR data, in accordance with some embodiments of the present disclosure.
Figure 7:
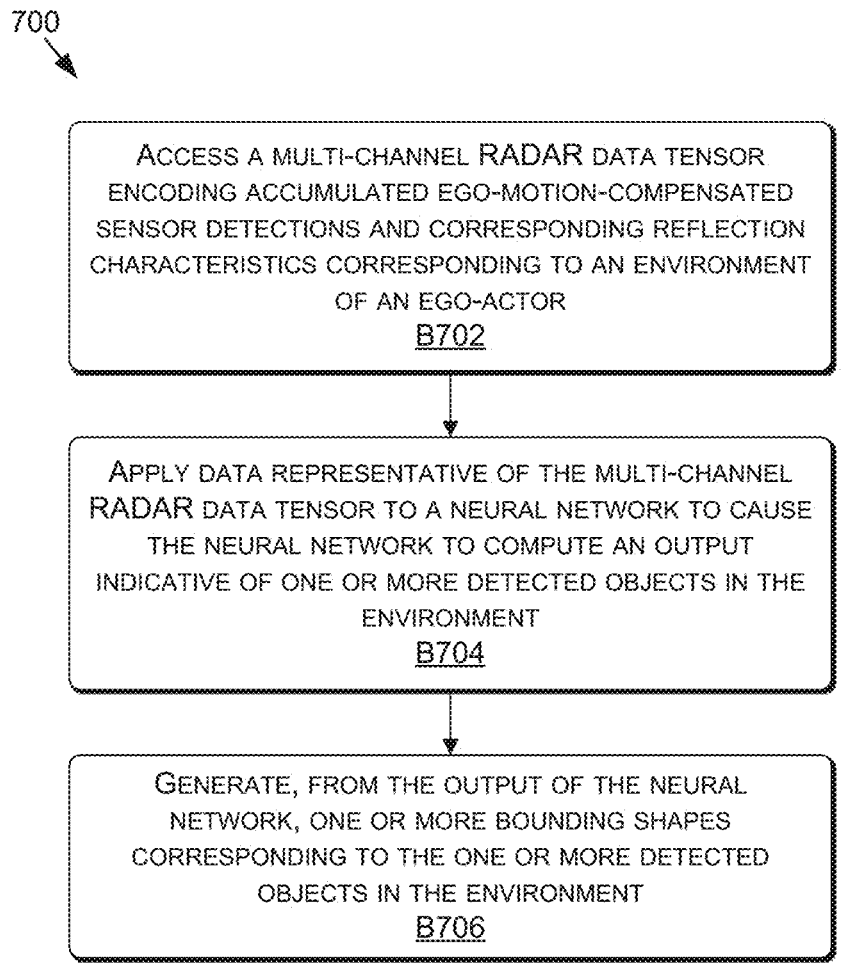
FIG. 7 is a flow diagram showing another method for object detection using RADAR data, in accordance with some embodiments of the present disclosure.
Figure 8:
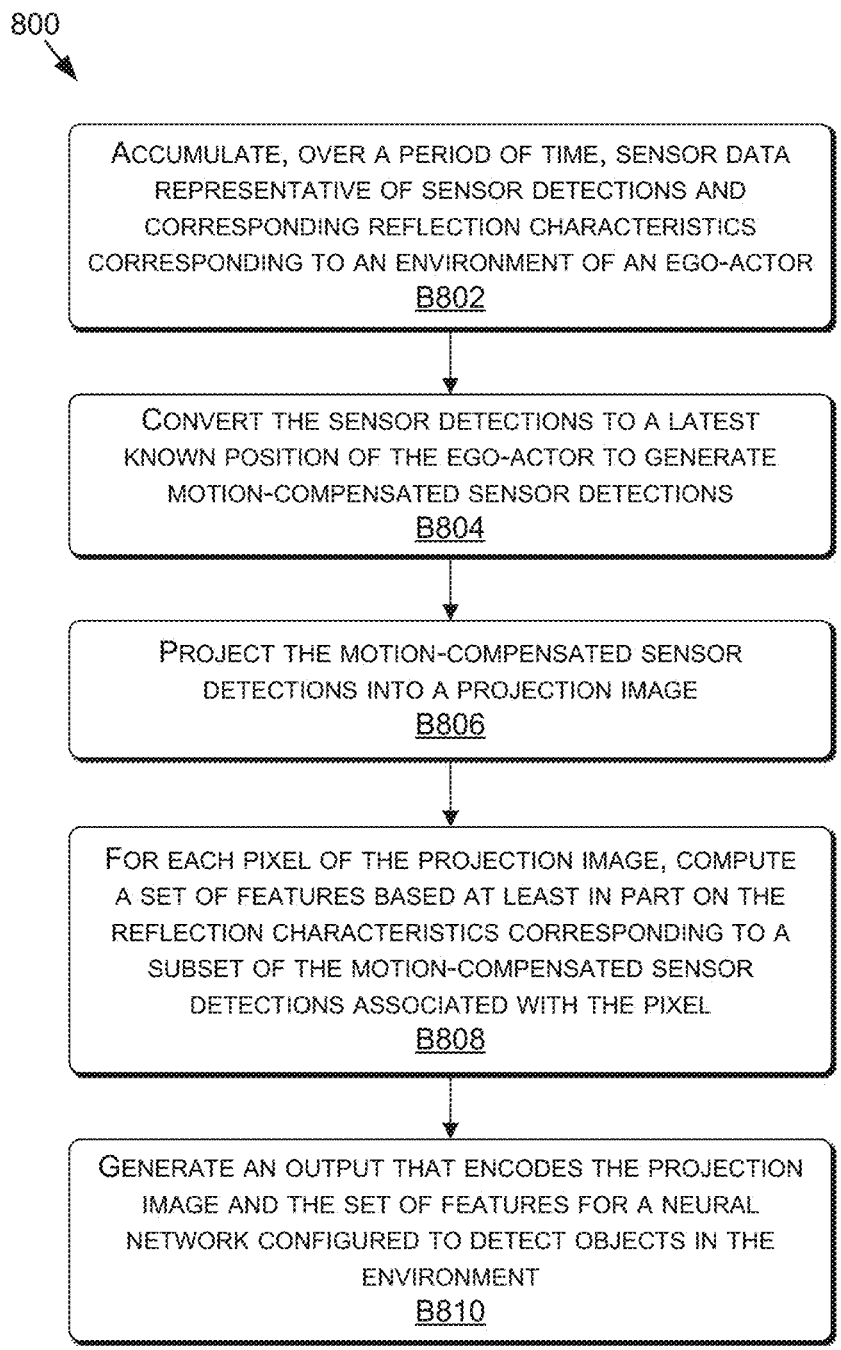
FIG. 8 is a flow diagram showing another method for object detection using RADAR data, in accordance with some embodiments of the present disclosure.

Now referring to FIGS. 6-8, each block of methods 600, 700, and 800, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 600, 700, and 800 are described, by way of example, with respect to the object detection system described herein. However, these methods may additionally or alternatively be executed by any one system, or any combination of systems, including, but not limited to, those described herein.

FIG. 6 is a flow diagram showing a method 600 for object detection using RADAR data, in accordance with some embodiments of the present disclosure. The method 600, at block B602, includes accumulating, over a period of time, RADAR data representative of sensor detections of one or more RADAR sensors of an ego-actor, such as a moving vehicle. For example, RADAR detections may be accumulated from multiple sensors, such as some or all the surrounding RADAR sensor(s) 1360 from different locations of the autonomous vehicle 1300, and may be transformed to a single vehicle coordinate system (e.g., centered around the vehicle). Additionally or alternatively, the sensor detections may be accumulated over time in order to increase the density of the accumulated sensor data.

The method 600, at block B604, includes generating motion-compensated sensor detections. For example, accumulated detections may be ego-motion-compensated to a latest known position of the ego-actor (e.g., moving vehicle). Locations of older detections may be propagated to a latest known position of the moving vehicle, using the known motion of the vehicle to estimate where the older detections will be located (e.g., relative to the present location of the vehicle) at the current point in time.

The method 600, at block B606, includes projecting the motion-compensated sensor detections into two-dimensional (2D) image-space to generate a projection image. For example, the motion-compensated sensor detections may be orthographically projected to form a projection image (e.g., from a top-down view) of a desired size (e.g., spatial dimension) and with a desired ground sampling distance.

The method 600, at block B608, includes applying data representative of the projection image to a neural network. For example, the projection image and corresponding reflection characteristics may be stored in multiple layers of a tensor, with pixel values for the different layers storing different reflection characteristics. In some embodiments, for each pixel on the projection image where one or more detections land, a set of features may be calculated, determined, or selected from the reflection characteristics of the RADAR detection(s) (e.g., bearing, azimuth, elevation, range, intensity, Doppler velocity, RADAR cross section (RCS), reflectivity, signal-to-noise ratio (SNR), etc.).

The method 600, at block B610, includes computing an output representative of one or more detected objects using the neural network and based at least in part on the data representative of the projection image. For example, the neural network may accept the projection image and corresponding reflection characteristics encoded into a suitable representation such as a tensor, and predict an output such as classification data (e.g., a class confidence tensor) and/or object instance data about each detected object instance (e.g., an instance regression tensor).

The method 600, at block B612, includes generating, based at least in part on the output of the neural network, at least one bounding shape corresponding to each object of the one or more detected objects. For example, the output may include classification data and/or object instance data, which may be used to compute multiple candidate bounding shapes, candidate bounding shapes may be filtered and/or clustered to remove duplicates.

FIG. 7 is a flow diagram showing a method 700 for object detection using RADAR data, in accordance with some embodiments of the present disclosure. The method 700, at block B702, includes accessing a multi-channel RADAR data tensor encoding accumulated ego-motion-compensated sensor detections and corresponding reflection characteristics corresponding to an environment of an ego-actor. For example, the multi-channel RADAR data tensor may include a projection image of the accumulated ego-motion-compensated sensor detections with pixel values for different channels of the multi-channel RADAR data tensor storing different reflection characteristics.

The method 700, at block B704, includes applying data representative of the multi-channel RADAR data tensor to a neural network to cause the neural network to compute an output indicative of one or more detected objects in the environment. For example, the neural network may accept the multi-channel RADAR data tensor, a corresponding projection image, and/or corresponding reflection characteristics, and predict an output such as classification data (e.g., a class confidence tensor) and/or object instance data about each detected object instance (e.g., an instance regression tensor).

The method 700, at block B706, includes generating, from the output of the neural network, one or more bounding shapes corresponding to the one or more detected objects in the environment. For example, the output may include classification data and/or object instance data, which may be used to compute multiple candidate bounding shapes, and the candidate bounding shapes may be filtered and/or clustered to remove duplicates.

FIG. 8 is a flow diagram showing a method 800 for object detection using RADAR data, in accordance with some embodiments of the present disclosure. The method 800, at block B802, includes accumulating, over a period of time, sensor data representative of sensor detections and corresponding reflection characteristics corresponding to an environment of an ego-actor, such as a moving vehicle. For example, RADAR detections may be accumulated from multiple sensors, such as some or all the surrounding RADAR sensor(s) 1360 from different locations of the autonomous vehicle 1300, and may be transformed to a single vehicle coordinate system (e.g., centered around the vehicle). Additionally or alternatively, the sensor detections may be accumulated over time in order to increase the density of the accumulated sensor data.

The method 800, at block B804, includes converting the sensor detections to a latest known position of the ego-actor to generate motion-compensated sensor detections. For example, the sensor detections may be ego-motion-compensated to a latest known position of the ego-actor (e.g., moving vehicle). Locations of older detections may be propagated to a latest known position of the moving vehicle, using the known motion of the vehicle to estimate where the older detections will be located (e.g., relative to the present location of the vehicle) at the current point in time.

The method 800, at block B806, includes projecting the motion-compensated sensor detections into a projection image. For example, the motion-compensated sensor detections may be orthographically projected to form a projection image (e.g., from a top-down view) of a desired size (e.g., spatial dimension) and with a desired ground sampling distance.

The method 800, at block B808, includes for each pixel of the projection image, computing a set of features based at least in part on the reflection characteristics corresponding to a subset of the motion-compensated sensor detections associated with the pixel. For example, in some embodiments, for each pixel on the projection image where one or more detections land, a set of features may be calculated, determined, or selected from the reflection characteristics of the RADAR detection(s) (e.g., bearing, azimuth, elevation, range, intensity, Doppler velocity, RADAR cross section (RCS), reflectivity, signal-to-noise ratio (SNR), etc.). When there are multiple detections landing on a pixel, thereby forming a tower of points, a particular feature may be calculated by aggregating a corresponding reflection characteristic for the multiple overlapping detections (e.g., using standard deviation, average, etc.).

The method 800, at block B810, includes generating an output that encodes the projection image and the set of features for a neural network configured to detect objects in the environment. For example, the projection image and corresponding reflection characteristics may be stored in multiple layers of a tensor, with pixel values for the different layers storing different reflection characteristics.

Training Machine Learning Model(s) of an Object Detection System

In order to train a machine learning model for an object detection system (e.g., machine learning model(s) 108 of FIG. 1), training data may be generated from sensor data using the pre-processing technique described above (e.g., pre-processing 104 of FIG. 1). However, given how sparse RADAR data may be, it is often challenging to distinguish objects such as vehicles in the RADAR data alone. As such, in some embodiments, ground truth data may be generated from LIDAR data generated from one or more LIDAR sensor(s).

For example, a scene may be observed with RADAR and LIDAR sensors (e.g., RADAR sensor(s) 1360 and LIDAR sensor(s) 1364 of autonomous vehicle 1300 of FIGS. 13A-13D) to collect a frame of RADAR data and LIDAR data for a particular time slice. The RADAR data may be used to generate an input RADAR data tensor using the pre-processing technique described above (e.g., pre-processing 104 of FIG. 1). The LIDAR data associated with the same or closest time slice as the RADAR data may be used to generate ground truth labels, which may be used to generate ground truth classification data and/or object instance data corresponding to the output of machine learning model(s) 108 (e.g., class confidence tensor 110 and instance regression tensor 112 of FIG. 1).

Figure 9B:
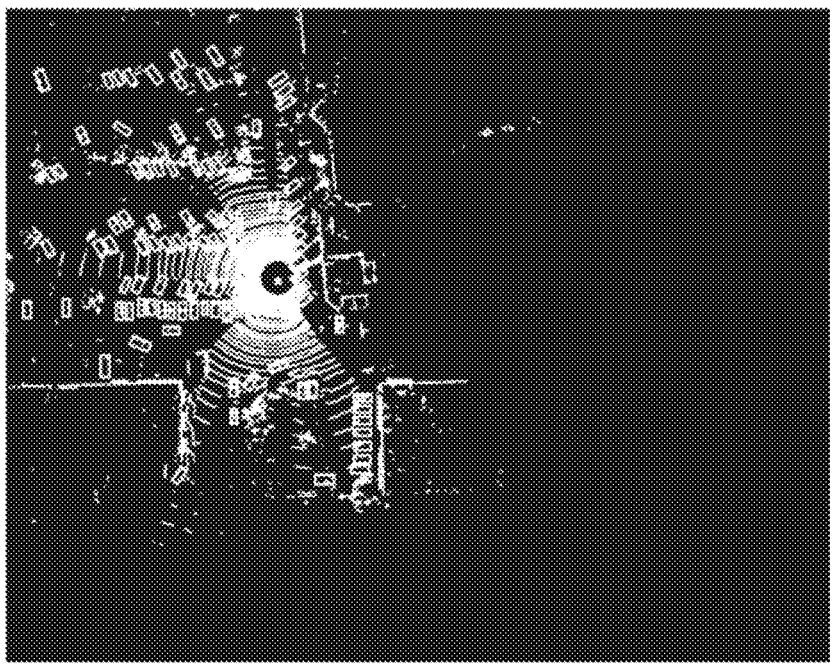
FIG. 9B is an illustration of the corresponding LIDAR frame with the ground truth bounding boxes, in accordance with some embodiments of the present disclosure.

More specifically, a LIDAR point cloud may be orthographically projected to form a LIDAR projection image (e.g., an overhead image) corresponding to the RADAR projection image contained in the RADAR data tensor (e.g., having the same dimensionality, perspective, and/or ground sampling distance). The LIDAR projection image may be annotated (e.g., manually, automatically, etc.) with labels identifying the locations, sizes, orientations, and/or classes of the instances of the relevant objects in the LIDAR projection image. The LIDAR labels may be generated within a drawing program (e.g., an annotation program), a computer aided design (CAD) program, a labeling program, another type of suitable program, and/or may be hand drawn, in some examples. In any example, the LIDAR labels may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). Generally, the LIDAR labels may comprise bounding boxes, closed polylines, or other bounding shapes drawn, annotated, superimposed, and/or otherwise associated with the LIDAR projection image. FIG. 9B is an illustration of an example LIDAR frame with white ground truth bounding boxes.

Generally, the LIDAR labels identified from the LIDAR frame may be used to generate a corresponding class confidence tensor and instance regression tensor that may serve as ground truth data for the DNN. However, certain LIDAR labels may be selected for use in generating ground truth data based on corresponding RADAR data. More specifically, the LIDAR labels identified from the LIDAR frame may be propagated to a corresponding RADAR projection image for a closest frame of RADAR data (e.g., associated with the same time slice). In some embodiments, the LIDAR projection image and the RADAR projection image may correspond with one another (e.g., have the same dimensionality, perspective, and/or ground sampling distance). This can facilitate a direct comparison between LIDAR and RADAR detections, and an evaluation of which LIDAR labels correspond to observed RADAR detections. For example, the number of RADAR detections each propagated LIDAR label contains may be determined, and LIDAR labels containing less than some threshold number of RADAR detections may be omitted from use in generating ground truth data. As such, the remaining LIDAR labels may be used as ground truth labels to generate ground truth data for machine learning model(s) 108.

Figure 9A:
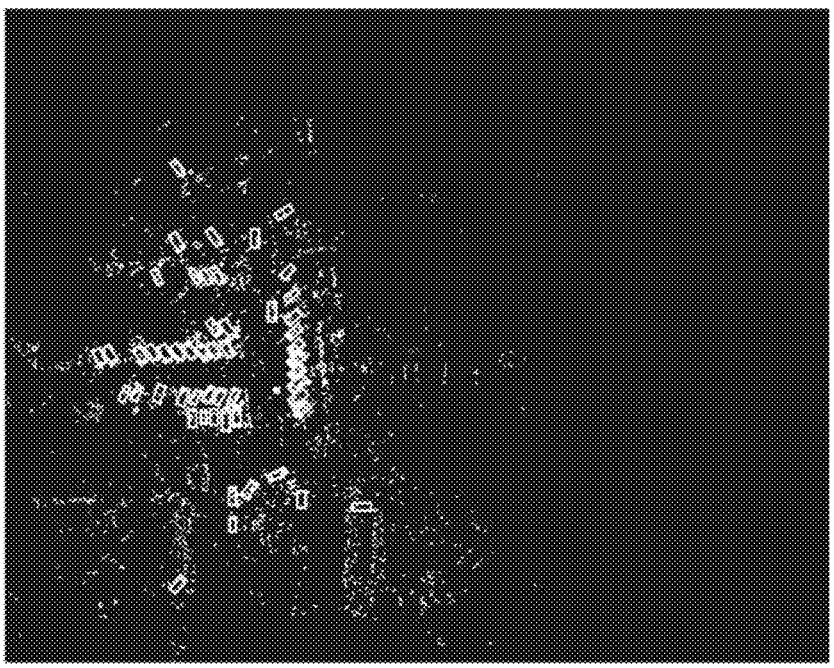
FIG. 9A is an illustration of an example orthographic projection of accumulated RADAR detections and corresponding ground truth bounding boxes propagated from a corresponding LIDAR frame and filtered based on a minimum number of RADAR detections per bounding box.

FIG. 9A is an illustration of an example orthographic projection of accumulated RADAR detections and ground truth bounding boxes (shown in white) propagated from a corresponding LIDAR frame, and FIG. 9B is an illustration of the corresponding LIDAR frame with ground truth bounding boxes, in accordance with some embodiments of the present disclosure. Note that the LIDAR detections in FIG. 9B are more dense than the RADAR detections in FIG. 9A. As such, the denser LIDAR detections may be easier to label than the sparser RADAR detections. As illustrated in FIGS. 9A and 9B, the LIDAR labels (shown in white) from the LIDAR frame (more specifically, a LIDAR projection image of the LIDAR frame) illustrated in FIG. 9B have been propagated to the corresponding RADAR frame (more specifically, a RADAR projection image of the RADAR frame) illustrated in FIG. 9A. In FIG. 9A, propagated LIDAR labels containing less than some threshold number of RADAR detections have been omitted. The remaining LIDAR labels may be used as ground truth labels to generate ground truth data for machine learning model(s) 108.

To generate ground truth data from the (remaining) LIDAR labels, the location, size, orientation, and/or class of each of the (remaining) LIDAR labels may be used to generate a confidence map matching the size and dimensionality of class confidence tensor 110. By way of non-limiting example, for a given class and a corresponding dimension of class confidence tensor 110, pixel values for pixels falling within each labeled bounding shape for that class may be set to a value indicating a positive classification (e.g., 1). The process may be repeated and stored in corresponding channels of a ground truth class confidence tensor. Additionally or alternatively, the location, size, orientation, and/or class of each of the (remaining) LIDAR labels may be used to generate object instance data matching the size and dimensionality of instance regression tensor 112. For example, for each pixel contained with the LIDAR label, the LIDAR label may be used to compute corresponding location, size, and/or orientation information (e.g., where the object is located—such as the object center—relative to each pixel, object height, object width, object orientation (e.g., rotation angles relative to the orientation of the projection image), and/or the like). The computed object instance data may be stored in a corresponding channel of a ground truth instance regression tensor. Thus, LIDAR labels may be used to generate ground truth class segmentation and/or instance regression tensors, which may be used with corresponding RADAR data tensors as part of a training dataset to train machine learning model(s) 108.

More specifically, the training set of RADAR data tensors may be input into machine learning model(s) 108, and the ground truth class segmentation and/or instance regression tensors may be used to train machine learning model(s) 108. For example, one or more loss functions (e.g., a single loss function, a loss function for each output type, etc.) may be used to compare the accuracy of the output(s) of machine learning model(s) 108 to ground truth, and the parameters of the machine learning model(s) 108 may be updated (e.g., using backward passes, backpropagation, forward passed, etc.) until the accuracy reaches an optimal or acceptable level. In some embodiments in which machine learning model(s) 108 includes multiple heads, the multiple heads may be co-trained together with a common trunk, or may be trained separately. In embodiments involving multi-view scenarios with separate DNN featurizers, the DNN featurizers may be co-trained together or separately. These and other variations are contemplated within the present disclosure.

Figure 10:
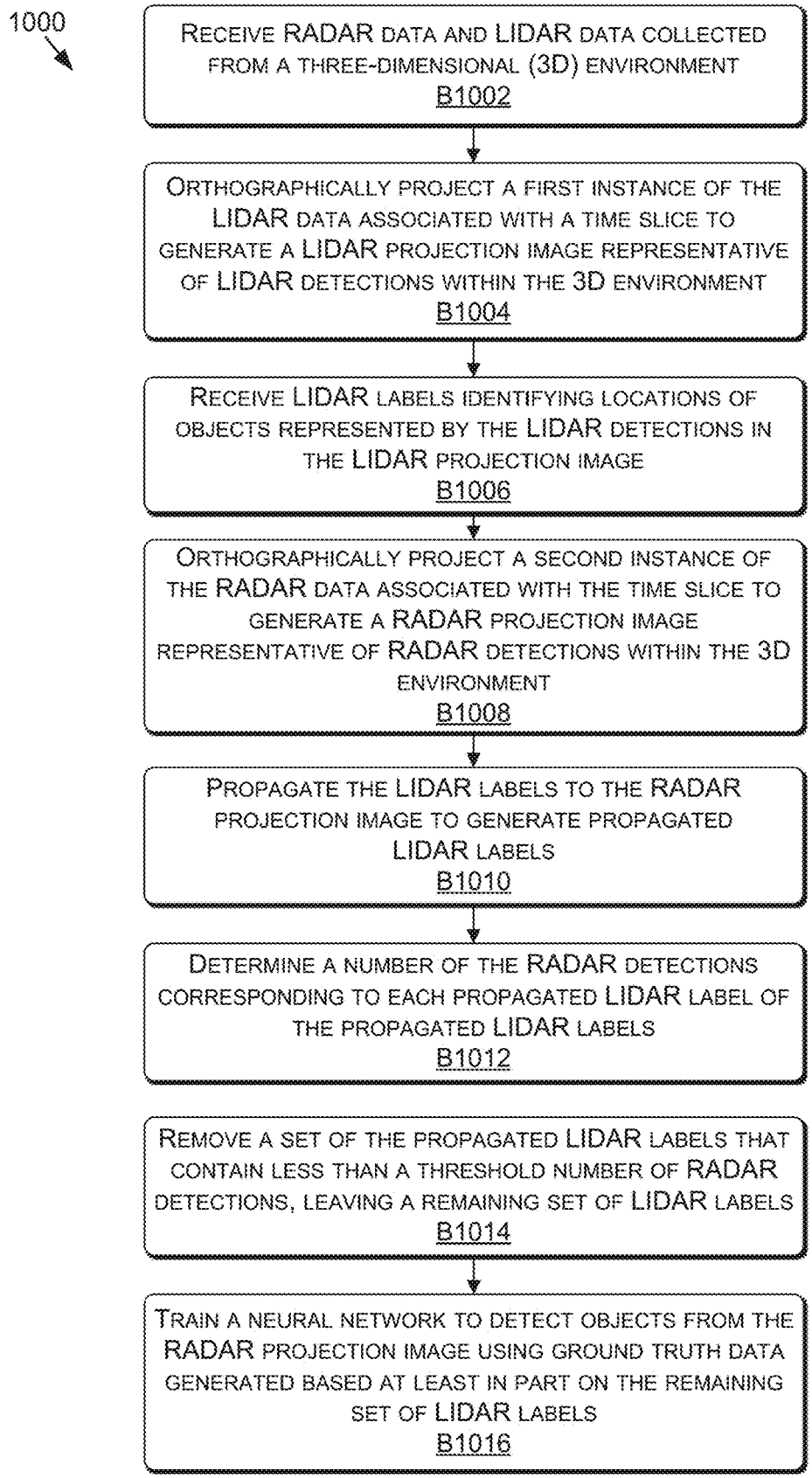
FIG. 10 is a flow diagram showing a method for training a machine learning model for object detection, in accordance with some embodiments of the present disclosure.
Figure 11:
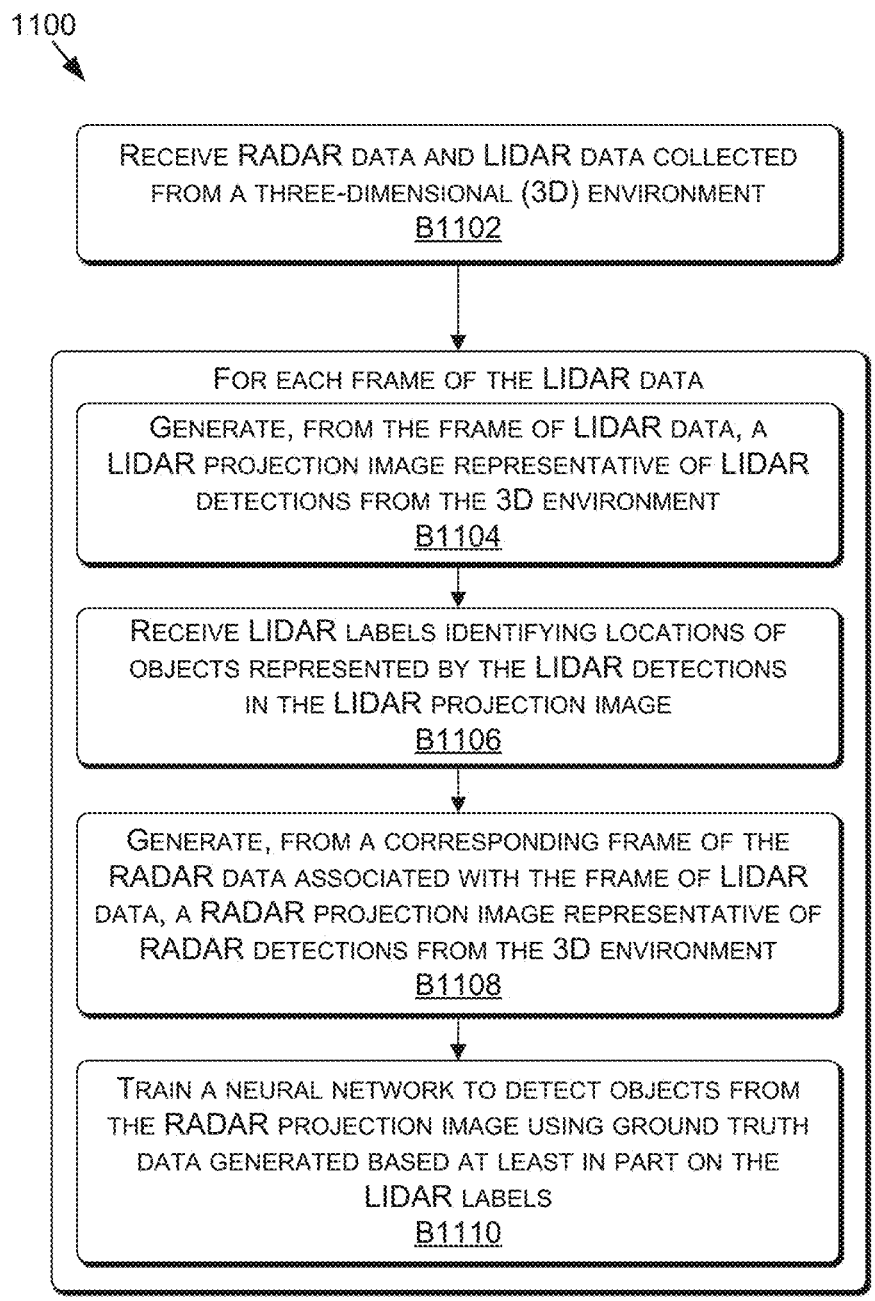
FIG. 11 is a flow diagram showing another method for training a machine learning model for object detection, in accordance with some embodiments of the present disclosure.
Figure 12:
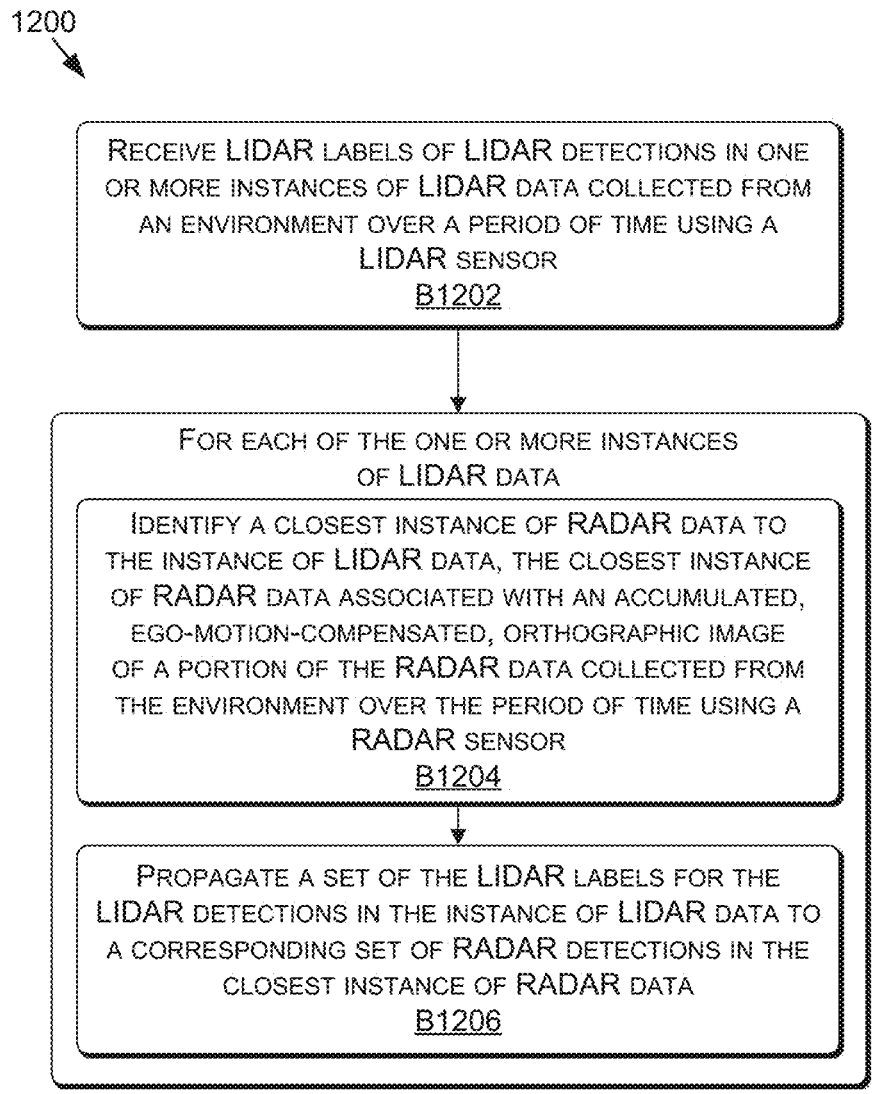
FIG. 12 is a flow diagram showing a method for propagating LIDAR labels to RADAR data, in accordance with some embodiments of the present disclosure.

Now referring to FIGS. 10-12, each block of methods 1000, 1100, and 1200, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. In addition, methods 900, 1000, and 1100 are described, by way of example, with respect to the training process for an object detection system described above. However, these methods may additionally or alternatively be executed by any one system, or any combination of systems, including, but not limited to, those described herein.

FIG. 10 is a flow diagram showing a method 1000 for training a machine learning model for object detection, in accordance with some embodiments of the present disclosure. The method 1000, at block B1002, includes receiving RADAR data and LIDAR data collected from a three-dimensional (3D) environment. For example, a scene may be observed with RADAR and LIDAR sensors (e.g., RADAR sensor(s) 1360 and LIDAR sensor(s) 1364 of autonomous vehicle 1300 of FIGS. 13A-13D) to collect RADAR data and LIDAR data.

The method 1000, at block B1004, includes orthographically projecting a first instance of the LIDAR data associated with a time slice to generate a LIDAR projection image representative of LIDAR detections within the 3D environment.

The method 1000, at block B1006, includes receiving LIDAR labels identifying locations of objects represented by the LIDAR detections in the LIDAR projection image. For example, the LIDAR labels may be generated within a drawing program (e.g., an annotation program), a computer aided design (CAD) program, a labeling program, another type of suitable program, and/or may be hand drawn.

The method 1000, at block B1008, includes orthographically projecting a second instance of the RADAR data associated with the time slice to generate a RADAR projection image representative of RADAR detections within the 3D environment. The LIDAR projection image and the RADAR projection image may correspond with one another (e.g., have the same dimensionality, perspective, and/or ground sampling distance).

The method 1000, at block B1010, includes propagating the LIDAR labels to the RADAR projection image to generate propagated LIDAR labels.

The method 1000, at block B1012, includes determining a number of the RADAR detections corresponding to each propagated LIDAR label of the propagated LIDAR labels.

The method 1000, at block B1014, includes removing a set of the propagated LIDAR labels that contain less than a threshold number of RADAR detections, leaving a remaining set of LIDAR labels.

The method 1000, at block B1016, includes training a neural network to detect objects from the RADAR projection image using ground truth data generated based at least in part on the remaining set of LIDAR labels. For example, ground truth data matching the size and dimensionality of the output(s) of the neural network (e.g., machine learning model(s) 108) may be generated using the location, size, orientation, and/or class of each LIDAR label from the remaining set of LIDAR labels, and the neural network may be trained using the ground truth data.

FIG. 11 is a flow diagram showing a method 1100 for training a machine learning model for object detection, in accordance with some embodiments of the present disclosure. The method 1100, at block B1102, includes receiving RADAR data and LIDAR data collected from a three-dimensional (3D) environment. For example, a scene may be observed with both RADAR and LIDAR sensors (e.g., RADAR sensor(s) 1360 and LIDAR sensor(s) 1364 of autonomous vehicle 1300 of FIGS. 13A-13D) to collect RADAR data and LIDAR data.

The method 1100, at block B1104, includes, for each frame of the LIDAR data, performing steps indicated in blocks B1104-B1110. For example, the method 1100 at block B1104 includes, for each frame of the LIDAR data, generating, from the frame of LIDAR data, a LIDAR projection image representative of LIDAR detections from the 3D environment. For example, LIDAR detections (e.g., a LIDAR point cloud) from the frame of LIDAR data may be orthographically projected to form a LIDAR projection image (e.g., an overhead image).

The method 1100, at block B1106, includes, for each frame of the LIDAR data, receiving LIDAR labels identifying locations of objects represented by the LIDAR detections in the LIDAR projection image. For example, the LIDAR labels may be generated within a drawing program (e.g., an annotation program), a computer aided design (CAD) program, a labeling program, another type of suitable program, and/or may be hand drawn.

The method 1100, at block B1108, includes, for each frame of the LIDAR data, generating, from a corresponding frame of the RADAR data associated with the frame of LIDAR data, a RADAR projection image representative of RADAR detections from the 3D environment. For example, RADAR detections (e.g., a RADAR point cloud) from the corresponding frame of RADAR data may be orthographically projected to form the RADAR projection image (e.g., an overhead image).

The method 1100, at block B1110, includes, for each frame of the LIDAR data, training a neural network to detect objects from the RADAR projection image using ground truth data generated based at least in part on the LIDAR labels. For example, ground truth data matching the size and dimensionality of the output(s) of the neural network (e.g., machine learning model(s) 108) may be generated using the location, size, orientation, and/or class of the LIDAR labels, and the neural network may be trained using the ground truth data.

FIG. 12 is a flow diagram showing a method 1200 for propagating LIDAR labels to RADAR data, in accordance with some embodiments of the present disclosure. The method 1200, at block B1202, includes receiving LIDAR labels of LIDAR detections in one or more instances of LIDAR data collected from an environment over a period of time using a LIDAR sensor. For example, a scene may be observed with LIDAR sensors (e.g., LIDAR sensor(s) 1364 of autonomous vehicle 1300 of FIGS. 13A-13D) to collect LIDAR data. The LIDAR labels may be generated within a drawing program (e.g., an annotation program), a computer aided design (CAD) program, a labeling program, another type of suitable program, and/or may be hand drawn.

The method 1200, at block B1204, includes, for each of the one or more instances of LIDAR data, performing steps indicated in blocks B1204-B1206. For example, the method 1200 at block B1204 includes, for each of the one or more instances of LIDAR data, identifying a closest instance of RADAR data to the instance of LIDAR data, the closest instance of RADAR data associated with an accumulated, ego-motion-compensated, orthographic image of a portion of the RADAR data collected from the environment over the period of time using a RADAR sensor. For example, a scene may be observed with both RADAR and LIDAR sensors (e.g., RADAR sensor(s) 1360 and LIDAR sensor(s) 1364 of autonomous vehicle 1300 of FIGS. 13A-13D) to collect RADAR data and LIDAR data, and the closest instance of RADAR data to the instance of LIDAR data may be identified based on the RADAR data and the LIDAR data being associated with the same time slice.

The method 1200, at block B1206, includes, for each of the one or more instances of LIDAR data, propagating a set of the LIDAR labels for the LIDAR detections in the instance of LIDAR data to a corresponding set of RADAR detections in the closest instance of RADAR data. A determination may be made how many of the RADAR detections are contained within each of the propagated LIDAR labels, and propagated LIDAR labels containing less than some threshold number of RADAR detections (e.g., 2, 5, etc.) may be omitted. The remaining LIDAR labels may be used as ground truth labels to generate ground truth data for a machine learning model (e.g., machine learning model(s) 108).

Example Autonomous Vehicle

FIG. 13A is an illustration of an example autonomous vehicle 1300, in accordance with some embodiments of the present disclosure. The autonomous vehicle 1300 (alternatively referred to herein as the "vehicle 1300") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1300 may be capable of functionality in accordance with one or more of Level 3-Level 5 of the autonomous driving levels. For example, the vehicle 1300 may be capable of conditional automation (Level 3), high automation (Level 4), and/or full automation (Level 5), depending on the embodiment.

The vehicle 1300 may include components such as a chassis, a vehicle body, wheels (e.g., 2, 4, 6, 8, 18, etc.), tires, axles, and other components of a vehicle. The vehicle 1300 may include a propulsion system 1350, such as an internal combustion engine, hybrid electric power plant, an all-electric engine, and/or another propulsion system type. The propulsion system 1350 may be connected to a drive train of the vehicle 1300, which may include a transmission, to enable the propulsion of the vehicle 1300. The propulsion system 1350 may be controlled in response to receiving signals from the throttle/accelerator 1352.

A steering system 1354, which may include a steering wheel, may be used to steer the vehicle 1300 (e.g., along a desired path or route) when the propulsion system 1350 is operating (e.g., when the vehicle is in motion). The steering system 1354 may receive signals from a steering actuator 1356. The steering wheel may be optional for full automation (Level 5) functionality.

The brake sensor system 1346 may be used to operate the vehicle brakes in response to receiving signals from the brake actuators 1348 and/or brake sensors.

Controller(s) 1336, which may include one or more system on chips (SoCs) 1304 (FIG. 13C) and/or GPU(s), may provide signals (e.g., representative of commands) to one or more components and/or systems of the vehicle 1300. For example, the controller(s) may send signals to operate the vehicle brakes via one or more brake actuators 1348, to operate the steering system 1354 via one or more steering actuators 1356, to operate the propulsion system 1350 via one or more throttle/accelerators 1352. The controller(s) 1336 may include one or more onboard (e.g., integrated) computing devices (e.g., supercomputers) that process sensor signals, and output operation commands (e.g., signals representing commands) to enable autonomous driving and/or to assist a human driver in driving the vehicle 1300. The controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In some examples, a single controller 1336 may handle two or more of the above functionalities, two or more controllers 1336 may handle a single functionality, and/or any combination thereof.

The controller(s) 1336 may provide the signals for controlling one or more components and/or systems of the vehicle 1300 in response to sensor data received from one or more sensors (e.g., sensor inputs). The sensor data may be received from, for example and without limitation, global navigation satellite systems sensor(s) 1358 (e.g., Global Positioning System sensor(s)), RADAR sensor(s) 1360, ultrasonic sensor(s) 1362, LIDAR sensor(s) 1364, inertial measurement unit (IMU) sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range and/or mid-range camera(s) 1398, speed sensor(s) 1344 (e.g., for measuring the speed of the vehicle 1300), vibration sensor(s) 1342, steering sensor(s) 1340, brake sensor(s) (e.g., as part of the brake sensor system 1346), and/or other sensor types.

One or more of the controller(s) 1336 may receive inputs (e.g., represented by input data) from an instrument cluster 1332 of the vehicle 1300 and provide outputs (e.g., represented by output data, display data, etc.) via a human-machine interface (HMI) display 1334, an audible annunciator, a loudspeaker, and/or via other components of the vehicle 1300. The outputs may include information such as vehicle velocity, speed, time, map data (e.g., the HD map 1322 of FIG. 13C), location data (e.g., the vehicle's 1300 location, such as on a map), direction, location of other vehicles (e.g., an occupancy grid), information about objects and status of objects as perceived by the controller(s) 1336, etc. For example, the HMI display 1334 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1300 further includes a network interface 1324 which may use one or more wireless antenna(s) 1326 and/or modem(s) to communicate over one or more networks. For example, the network interface 1324 may be capable of communication over LTE, WCDMA, UMTS, GSM, CDMA2000, etc. The wireless antenna(s) 1326 may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

FIG. 13B is an example of camera locations and fields of view for the example autonomous vehicle 1300 of FIG. 13A, in accordance with some embodiments of the present disclosure. The cameras and respective fields of view are one example embodiment and are not intended to be limiting. For example, additional and/or alternative cameras may be included and/or the cameras may be located at different locations on the vehicle 1300.

The camera types for the cameras may include, but are not limited to, digital cameras that may be adapted for use with the components and/or systems of the vehicle 1300. The camera(s) may operate at automotive safety integrity level (ASIL) B and/or at another ASIL. The camera types may be capable of any image capture rate, such as 60 frames per second (fps), 1320 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1300 (e.g., front-facing cameras) may be used for surround view, to help identify forward facing paths and obstacles, as well aid in, with the help of one or more controllers 1336 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1370 that may be used to perceive objects coming into view from the periphery (e.g., pedestrians, crossing traffic or bicycles). Although only one wide-view camera is illustrated in FIG. 13B, there may any number of wide-view cameras 1370 on the vehicle 1300. In addition, long-range camera(s) 1398 (e.g., a long-view stereo camera pair) may be used for depth-based object detection, especially for objects for which a neural network has not yet been trained. The long-range camera(s) 1398 may also be used for object detection and classification, as well as basic object tracking.

One or more stereo cameras 1368 may also be included in a front-facing configuration. The stereo camera(s) 1368 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1368 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1368 may be used in addition to, or alternatively from, those described herein.

Cameras with a field of view that include portions of the environment to the side of the vehicle 1300 (e.g., side-view cameras) may be used for surround view, providing information used to create and update the occupancy grid, as well as to generate side impact collision warnings. For example, surround camera(s) 1374 (e.g., four surround cameras 1374 as illustrated in FIG. 13B) may be positioned to on the vehicle 1300. The surround camera(s) 1374 may include wide-view camera(s) 1370, fisheye camera(s), 360 degree camera(s), and/or the like. Four example, four fisheye cameras may be positioned on the vehicle's front, rear, and sides. In an alternative arrangement, the vehicle may use three surround camera(s) 1374 (e.g., left, right, and rear), and may leverage one or more other camera(s) (e.g., a forward-facing camera) as a fourth surround view camera.

Cameras with a field of view that include portions of the environment to the rear of the vehicle 1300 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1398, stereo camera(s) 1368), infrared camera(s) 1372, etc.), as described herein.

FIG. 13C is a block diagram of an example system architecture for the example autonomous vehicle 1300 of FIG. 13A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1300 in FIG. 13C are illustrated as being connected via bus 1302. The bus 1302 may include a Controller Area Network (CAN) data interface (alternatively referred to herein as a "CAN bus"). A CAN may be a network inside the vehicle 1300 used to aid in control of various features and functionality of the vehicle 1300, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1302 is described herein as being a CAN bus, this is not intended to be limiting. For example, in addition to, or alternatively from, the CAN bus, FlexRay and/or Ethernet may be used. Additionally, although a single line is used to represent the bus 1302, this is not intended to be limiting. For example, there may be any number of busses 1302, which may include one or more CAN busses, one or more FlexRay busses, one or more Ethernet busses, and/or one or more other types of busses using a different protocol. In some examples, two or more busses 1302 may be used to perform different functions, and/or may be used for redundancy. For example, a first bus 1302 may be used for collision avoidance functionality and a second bus 1302 may be used for actuation control. In any example, each bus 1302 may communicate with any of the components of the vehicle 1300, and two or more busses 1302 may communicate with the same components. In some examples, each SoC 1304, each controller 1336, and/or each computer within the vehicle may have access to the same input data (e.g., inputs from sensors of the vehicle 1300), and may be connected to a common bus, such the CAN bus.

The vehicle 1300 may include one or more controller(s) 1336, such as those described herein with respect to FIG. 13A. The controller(s) 1336 may be used for a variety of functions. The controller(s) 1336 may be coupled to any of the various other components and systems of the vehicle 1300, and may be used for control of the vehicle 1300, artificial intelligence of the vehicle 1300, infotainment for the vehicle 1300, and/or the like.

The vehicle 1300 may include a system(s) on a chip (SoC) 1304. The SoC 1304 may include CPU(s) 1306, GPU(s) 1308, processor(s) 1310, cache(s) 1312, accelerator(s) 1314, data store(s) 1316, and/or other components and features not illustrated. The SoC(s) 1304 may be used to control the vehicle 1300 in a variety of platforms and systems. For example, the SoC(s) 1304 may be combined in a system (e.g., the system of the vehicle 1300) with an HD map 1322 which may obtain map refreshes and/or updates via a network interface 1324 from one or more servers (e.g., server(s) 1378 of FIG. 13D).

The CPU(s) 1306 may include a CPU cluster or CPU complex (alternatively referred to herein as a "CCPLEX"). The CPU(s) 1306 may include multiple cores and/or L2 caches. For example, in some embodiments, the CPU(s)

1306 may include eight cores in a coherent multi-processor configuration. In some embodiments, the CPU(s) 1306 may include four dual-core clusters where each cluster has a dedicated L2 cache (e.g., a 2 MB L2 cache). The CPU(s) 1306 (e.g., the CCPLEX) may be configured to support simultaneous cluster operation enabling any combination of the clusters of the CPU(s) 1306 to be active at any given time.

The CPU(s) 1306 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1306 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1308 may include an integrated GPU (alternatively referred to herein as an "iGPU"). The GPU(s) 1308 may be programmable and may be efficient for parallel workloads. The GPU(s) 1308, in some examples, may use an enhanced tensor instruction set. The GPU(s) 1308 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 1308 may include at least eight streaming microprocessors. The GPU(s) 1308 may use compute application programming interface(s) (API(s)). In addition, the GPU(s) 1308 may use one or more parallel computing platforms and/or programming models (e.g., NVIDIA's CUDA).

The GPU(s) 1308 may be power-optimized for best performance in automotive and embedded use cases. For example, the GPU(s) 1308 may be fabricated on a Fin field-effect transistor (FinFET). However, this is not intended to be limiting and the GPU(s) 1308 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1308 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 1308 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1308 to access the CPU(s) 1306 page tables directly. In such examples, when the GPU(s) 1308 memory management unit (MMU) experiences a miss, an address translation request may be transmitted to the CPU(s) 1306. In response, the CPU(s) 1306 may look in its page tables for the virtual-to-physical mapping for the address and transmits the translation back to the GPU(s) 1308. As such, unified memory technology may allow a single unified virtual address space for memory of both the CPU(s) 1306 and the GPU(s) 1308, thereby simplifying the GPU(s) 1308 programming and porting of applications to the GPU(s) 1308.

In addition, the GPU(s) 1308 may include an access counter that may keep track of the frequency of access of the GPU(s) 1308 to memory of other processors. The access counter may help ensure that memory pages are moved to the physical memory of the processor that is accessing the pages most frequently.

The SoC(s) 1304 may include any number of cache(s) 1312, including those described herein. For example, the cache(s) 1312 may include an L3 cache that is available to both the CPU(s) 1306 and the GPU(s) 1308 (e.g., that is connected both the CPU(s) 1306 and the GPU(s) 1308). The cache(s) 1312 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1304 may include one or more accelerators 1314 (e.g., hardware accelerators, software accelerators, or a combination thereof). For example, the SoC(s) 1304 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1308 and to off-load some of the tasks of the GPU(s) 1308 (e.g., to free up more cycles of the GPU(s) 1308 for performing other tasks). As an example, the accelerator(s) 1314 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1314 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1308, and by using an inference accelerator, for example, a designer may target either the DLA(s) or the GPU(s) 1308 for any function. For example, the designer may focus processing of CNNs and floating point operations on the DLA(s) and leave other functions to the GPU(s) 1308 and/or other accelerator(s) 1314.

The accelerator(s) 1314 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1306. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1314 (e.g., the hardware acceleration cluster) may include a computer vision network on-chip and SRAM, for providing a high-bandwidth, low latency SRAM for the accelerator(s) 1314. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1304 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

The accelerator(s) 1314 (e.g., the hardware accelerator cluster) have a wide array of uses for autonomous driving.

The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1366 output that correlates with the vehicle 1300 orientation, distance, 3D location estimates of the object obtained from the neural network and/or other sensors (e.g., LIDAR sensor(s) 1364 or RADAR sensor(s) 1360), among others.

The SoC(s) 1304 may include data store(s) 1316 (e.g., memory). The data store(s) 1316 may be on-chip memory of the SoC(s) 1304, which may store neural networks to be executed on the GPU and/or the DLA. In some examples, the data store(s) 1316 may be large enough in capacity to store multiple instances of neural networks for redundancy and safety. The data store(s) 1312 may comprise L2 or L3 cache(s) 1312. Reference to the data store(s) 1316 may include reference to the memory associated with the PVA, DLA, and/or other accelerator(s) 1314, as described herein.

The SoC(s) 1304 may include one or more processor(s) 1310 (e.g., embedded processors). The processor(s) 1310 may include a boot and power management processor that may be a dedicated processor and subsystem to handle boot power and management functions and related security enforcement. The boot and power management processor may be a part of the SoC(s) 1304 boot sequence and may provide runtime power management services. The boot power and management processor may provide clock and voltage programming, assistance in system low power state transitions, management of SoC(s) 1304 thermals and temperature sensors, and/or management of the SoC(s) 1304 power states. Each temperature sensor may be implemented as a ring-oscillator whose output frequency is proportional to temperature, and the SoC(s) 1304 may use the ring-oscillators to detect temperatures of the CPU(s) 1306, GPU(s) 1308, and/or accelerator(s) 1314. If temperatures are determined to exceed a threshold, the boot and power management processor may enter a temperature fault routine and put the SoC(s) 1304 into a lower power state and/or put the vehicle 1300 into a chauffeur to safe stop mode (e.g., bring the vehicle 1300 to a safe stop).

The processor(s) 1310 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1310 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1310 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1310 may further include a real-time camera engine that may include a dedicated processor subsystem for handling real-time camera management.

The processor(s) 1310 may further include a high-dynamic range signal processor that may include an image signal processor that is a hardware engine that is part of the camera processing pipeline.

The processor(s) 1310 may include a video image compositor that may be a processing block (e.g., implemented on a microprocessor) that implements video post-processing functions needed by a video playback application to produce the final image for the player window. The video image compositor may perform lens distortion correction on wide-view camera(s) 1370, surround camera(s) 1374, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1308 is not required to continuously render new surfaces. Even when the GPU(s) 1308 is powered on and active doing 3D rendering, the video image compositor may be used to offload the GPU(s) 1308 to improve performance and responsiveness.

The SoC(s) 1304 may further include a mobile industry processor interface (MIPI) camera serial interface for receiving video and input from cameras, a high-speed interface, and/or a video input block that may be used for camera and related pixel input functions. The SoC(s) 1304 may further include an input/output controller(s) that may be controlled by software and may be used for receiving I/O signals that are uncommitted to a specific role.

The SoC(s) 1304 may further include a broad range of peripheral interfaces to enable communication with peripherals, audio codecs, power management, and/or other devices. The SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus). The SoC(s) 1304 may further include dedicated high-performance mass storage controllers that may include their own DMA engines, and that may be used to free the CPU(s) 1306 from routine data management tasks.

The SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 1304 may be faster, more reliable, and even more energy-efficient and space-efficient than conventional systems. For example, the accelerator(s) 1314, when combined with the CPU(s) 1306, the GPU(s) 1308, and the data store(s) 1316, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1320) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 1308.

In some examples, a CNN for facial recognition and vehicle owner identification may use data from camera sensors to identify the presence of an authorized driver and/or owner of the vehicle 1300. The always on sensor processing engine may be used to unlock the vehicle when the owner approaches the driver door and turn on the lights, and, in security mode, to disable the vehicle when the owner leaves the vehicle. In this way, the SoC(s) 1304 provide for security against theft and/or carjacking.

In another example, a CNN for emergency vehicle detection and identification may use data from microphones 1396 to detect and identify emergency vehicle sirens. In contrast to conventional systems, that use general classifiers to detect sirens and manually extract features, the SoC(s) 1304 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1358. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 1362, until the emergency vehicle(s) passes.

The vehicle may include a CPU(s) 1318 (e.g., discrete CPU(s), or dCPU(s)), that may be coupled to the SoC(s) 1304 via a high-speed interconnect (e.g., PCIe). The CPU(s) 1318 may include an X86 processor, for example. The CPU(s) 1318 may be used to perform any of a variety of functions, including arbitrating potentially inconsistent results between ADAS sensors and the SoC(s) 1304, and/or monitoring the status and health of the controller(s) 1336 and/or infotainment SoC 1330, for example.

The vehicle 1300 may include a GPU(s) 1320 (e.g., discrete GPU(s), or dGPU(s)), that may be coupled to the SoC(s) 1304 via a high-speed interconnect (e.g., NVIDIA's NVLINK). The GPU(s) 1320 may provide additional artificial intelligence functionality, such as by executing redundant and/or different neural networks, and may be used to train and/or update neural networks based on input (e.g., sensor data) from sensors of the vehicle 1300.

The vehicle 1300 may further include the network interface 1324 which may include one or more wireless antennas 1326 (e.g., one or more wireless antennas for different communication protocols, such as a cellular antenna, a Bluetooth antenna, etc.). The network interface 1324 may be used to enable wireless connectivity over the Internet with the cloud (e.g., with the server(s) 1378 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1300 information about vehicles in proximity to the vehicle 1300 (e.g., vehicles in front of, on the side of, and/or behind the vehicle 1300). This functionality may be part of a cooperative adaptive cruise control functionality of the vehicle 1300.

The network interface 1324 may include a SoC that provides modulation and demodulation functionality and enables the controller(s) 1336 to communicate over wireless networks. The network interface 1324 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1300 may further include data store(s) 1328 which may include off-chip (e.g., off the SoC(s) 1304) storage. The data store(s) 1328 may include one or more storage elements including RAM, SRAM, DRAM, VRAM, Flash, hard disks, and/or other components and/or devices that may store at least one bit of data.

The vehicle 1300 may further include GNSS sensor(s) 1358. The GNSS sensor(s) 1358 (e.g., GPS and/or assisted GPS sensors), to assist in mapping, perception, occupancy grid generation, and/or path planning functions. Any number of GNSS sensor(s) 1358 may be used, including, for example and without limitation, a GPS using a USB connector with an Ethernet to Serial (RS-232) bridge.

The vehicle 1300 may further include RADAR sensor(s) 1360. The RADAR sensor(s) 1360 may be used by the vehicle 1300 for long-range vehicle detection, even in darkness and/or severe weather conditions. RADAR functional safety levels may be ASIL B. The RADAR sensor(s) 1360 may use the CAN and/or the bus 1302 (e.g., to transmit data generated by the RADAR sensor(s) 1360) for control and to access object tracking data, with access to Ethernet to access raw data in some examples. A wide variety of RADAR sensor types may be used. For example, and without limitation, the RADAR sensor(s) 1360 may be suitable for front, rear, and side RADAR use. In some example, Pulse Doppler RADAR sensor(s) are used.

The RADAR sensor(s) 1360 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1360 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1300 surroundings at higher speeds with minimal interference from traffic in adjacent lanes. The other two antennae may expand the field of view, making it possible to quickly detect vehicles entering or leaving the vehicle's 1300 lane.

Mid-range RADAR systems may include, as an example, a range of up to 1360 m (front) or 80 m (rear), and a field of view of up to 42 degrees (front) or 1350 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1300 may further include ultrasonic sensor(s) 1362. The ultrasonic sensor(s) 1362, which may be positioned at the front, back, and/or the sides of the vehicle 1300, may be used for park assist and/or to create and update an occupancy grid. A wide variety of ultrasonic sensor(s) 1362 may be used, and different ultrasonic sensor(s) 1362 may be used for different ranges of detection (e.g., 2.5 m, 4 m). The ultrasonic sensor(s) 1362 may operate at functional safety levels of ASIL B.

The vehicle 1300 may include LIDAR sensor(s) 1364. The LIDAR sensor(s) 1364 may be used for object and pedestrian detection, emergency braking, collision avoidance, and/or other functions. The LIDAR sensor(s) 1364 may be functional safety level ASIL B. In some examples, the vehicle 1300 may include multiple LIDAR sensors 1364 (e.g., two, four, six, etc.) that may use Ethernet (e.g., to provide data to a Gigabit Ethernet switch).

In some examples, the LIDAR sensor(s) 1364 may be capable of providing a list of objects and their distances for a 360-degree field of view. Commercially available LIDAR sensor(s) 1364 may have an advertised range of approximately 1300 m, with an accuracy of 2 cm-3 cm, and with support for a 1300 Mbps Ethernet connection, for example. In some examples, one or more non-protruding LIDAR sensors 1364 may be used. In such examples, the LIDAR sensor(s) 1364 may be implemented as a small device that may be embedded into the front, rear, sides, and/or corners of the vehicle 1300. The LIDAR sensor(s) 1364, in such examples, may provide up to a 1320-degree horizontal and 35-degree vertical field-of-view, with a 200 m range even for low-reflectivity objects. Front-mounted LIDAR sensor(s)

1364 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1300. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1364 may be less susceptible to motion blur, vibration, and/or shock.

The vehicle may further include IMU sensor(s) 1366. The IMU sensor(s) 1366 may be located at a center of the rear axle of the vehicle 1300, in some examples. The IMU sensor(s) 1366 may include, for example and without limitation, an accelerometer(s), a magnetometer(s), a gyroscope(s), a magnetic compass(es), and/or other sensor types. In some examples, such as in six-axis applications, the IMU sensor(s) 1366 may include accelerometers and gyroscopes, while in nine-axis applications, the IMU sensor(s) 1366 may include accelerometers, gyroscopes, and magnetometers.

In some embodiments, the IMU sensor(s) 1366 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1366 may enable the vehicle 1300 to estimate heading without requiring input from a magnetic sensor by directly observing and correlating the changes in velocity from GPS to the IMU sensor(s) 1366. In some examples, the IMU sensor(s) 1366 and the GNSS sensor(s) 1358 may be combined in a single integrated unit.

The vehicle may include microphone(s) 1396 placed in and/or around the vehicle 1300. The microphone(s) 1396 may be used for emergency vehicle detection and identification, among other things.

The vehicle may further include any number of camera types, including stereo camera(s) 1368, wide-view camera(s) 1370, infrared camera(s) 1372, surround camera(s) 1374, long-range and/or mid-range camera(s) 1398, and/or other camera types. The cameras may be used to capture image data around an entire periphery of the vehicle 1300. The types of cameras used depends on the embodiments and requirements for the vehicle 1300, and any combination of camera types may be used to provide the necessary coverage around the vehicle 1300. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 13A and FIG. 13B.

The vehicle 1300 may further include vibration sensor(s) 1342. The vibration sensor(s) 1342 may measure vibrations of components of the vehicle, such as the axle(s). For example, changes in vibrations may indicate a change in road surfaces. In another example, when two or more vibration sensors 1342 are used, the differences between the vibrations may be used to determine friction or slippage of the road surface (e.g., when the difference in vibration is between a power-driven axle and a freely rotating axle).

The vehicle 1300 may include an ADAS system 1338. The ADAS system 1338 may include a SoC, in some examples. The ADAS system 1338 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1360, LIDAR sensor(s) 1364, and/or a camera(s). The ACC systems may include longitudinal ACC and/or lateral ACC. Longitudinal ACC monitors and controls the distance to the vehicle immediately ahead of the vehicle 1300 and automatically adjust the vehicle speed to maintain a safe distance from vehicles ahead. Lateral ACC performs distance keeping, and advises the vehicle 1300 to change lanes when necessary. Lateral ACC is related to other ADAS applications such as LCA and CWS.

CACC uses information from other vehicles that may be received via the network interface 1324 and/or the wireless antenna(s) 1326 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1300), while the I2V communication concept provides information about traffic further ahead. CACC systems may include either or both I2V and V2V information sources. Given the information of the vehicles ahead of the vehicle 1300, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1360, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1360, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1300 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1300 if the vehicle 1300 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1300 is backing up. Some RCTW systems include AEB to ensure that the vehicle brakes are applied to avoid a crash. RCTW systems may use one or more rear-facing RADAR sensor(s) 1360, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1300, the vehicle 1300 itself must, in the case of conflicting results, decide whether to heed the result from a primary computer or a secondary computer (e.g., a first controller 1336 or a second controller 1336). For example, in some embodiments, the ADAS system 1338 may be a backup and/or secondary computer for providing perception information to a backup computer rationality module. The backup computer rationality monitor may run a redundant diverse software on hardware components to detect faults in perception and dynamic driving tasks. Outputs from the ADAS system 1338 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1304.

In other examples, ADAS system 1338 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1338 may be fed into the primary computer's perception block and/or the primary computer's dynamic driving task block. For example, if the ADAS system 1338 indicates a forward crash warning due to an object immediately ahead, the perception block may use this information when identifying objects. In other examples, the secondary computer may have its own neural network which is trained and thus reduces the risk of false positives, as described herein.

The vehicle 1300 may further include the infotainment SoC 1330 (e.g., an in-vehicle infotainment system (IVI)). Although illustrated and described as a SoC, the infotainment system may not be a SoC, and may include two or more discrete components. The infotainment SoC 1330 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1300. For example, the infotainment SoC 1330 may radios, disk players, navigation systems, video players, USB and Bluetooth connectivity, carputers, in-car entertainment, Wi-Fi, steering wheel audio controls, hands free voice control, a heads-up display (HUD), an HMI display 1334, a telematics device, a control panel (e.g., for controlling and/or interacting with various components, features, and/or systems), and/or other components. The infotainment SoC 1330 may further be used to provide information (e.g., visual and/or audible) to a user(s) of the vehicle, such as information from the ADAS system 1338, autonomous driving information such as planned vehicle maneuvers, trajectories, surrounding environment information (e.g., intersection information, vehicle information, road information, etc.), and/or other information.

The infotainment SoC 1330 may include GPU functionality. The infotainment SoC 1330 may communicate over the bus 1302 (e.g., CAN bus, Ethernet, etc.) with other devices, systems, and/or components of the vehicle 1300. In some examples, the infotainment SoC 1330 may be coupled to a supervisory MCU such that the GPU of the infotainment system may perform some self-driving functions in the event that the primary controller(s) 1336 (e.g., the primary and/or backup computers of the vehicle 1300) fail. In such an example, the infotainment SoC 1330 may put the vehicle 1300 into a chauffeur to safe stop mode, as described herein.

The vehicle 1300 may further include an instrument cluster 1332 (e.g., a digital dash, an electronic instrument cluster, a digital instrument panel, etc.). The instrument cluster 1332 may include a controller and/or supercomputer (e.g., a discrete controller or supercomputer). The instrument cluster 1332 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1330 and the instrument cluster 1332. In other words, the instrument cluster 1332 may be included as part of the infotainment SoC 1330, or vice versa.

FIG. 13D is a system diagram for communication between cloud-based server(s) and the example autonomous vehicle 1300 of FIG. 13A, in accordance with some embodiments of the present disclosure. The system 1376 may include server(s) 1378, network(s) 1390, and vehicles, including the vehicle 1300. The server(s) 1378 may include a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). The GPUs 1384, the CPUs 1380, and the PCIe switches may be interconnected with high-speed interconnects such as, for example and without limitation, NVLink interfaces 1388 developed by NVIDIA and/or PCIe connections 1386. In some examples, the GPUs 1384 are connected via NVLink and/or NVSwitch SoC and the GPUs 1384 and the PCIe switches 1382 are connected via PCIe interconnects. Although eight GPUs 1384, two CPUs 1380, and two PCIe switches are illustrated, this is not intended to be limiting. Depending on the embodiment, each of the server(s) 1378 may include any number of GPUs 1384, CPUs 1380, and/or PCIe switches. For example, the server(s) 1378 may each include eight, sixteen, thirty-two, and/or more GPUs 1384.

The server(s) 1378 may receive, over the network(s) 1390 and from the vehicles, image data representative of images showing unexpected or changed road conditions, such as recently commenced road-work. The server(s) 1378 may transmit, over the network(s) 1390 and to the vehicles, neural networks 1392, updated neural networks 1392, and/or map information 1394, including information regarding traffic and road conditions. The updates to the map information 1394 may include updates for the HD map 1322, such as information regarding construction sites, potholes, detours, flooding, and/or other obstructions. In some examples, the neural networks 1392, the updated neural networks 1392, and/or the map information 1394 may have resulted from new training and/or experiences represented in data received from any number of vehicles in the environment, and/or based on training performed at a datacenter (e.g., using the server(s) 1378 and/or other servers).

The server(s) 1378 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Once the machine learning models are trained, the machine learning models may be used by the vehicles (e.g., transmitted to the vehicles over the network(s) 1390, and/or the machine learning models may be used by the server(s) 1378 to remotely monitor the vehicles.

In some examples, the server(s) 1378 may receive data from the vehicles and apply the data to up-to-date real-time neural networks for real-time intelligent inferencing. The server(s) 1378 may include deep-learning supercomputers and/or dedicated AI computers powered by GPU(s) 1384, such as a DGX and DGX Station machines developed by NVIDIA. However, in some examples, the server(s) 1378 may include deep learning infrastructure that use only CPU-powered datacenters.

The deep-learning infrastructure of the server(s) 1378 may be capable of fast, real-time inferencing, and may use that capability to evaluate and verify the health of the processors, software, and/or associated hardware in the vehicle 1300. For example, the deep-learning infrastructure may receive periodic updates from the vehicle 1300, such as a sequence of images and/or objects that the vehicle 1300 has located in that sequence of images (e.g., via computer vision and/or other machine learning object classification techniques). The deep-learning infrastructure may run its own neural network to identify the objects and compare them with the objects identified by the vehicle 1300 and, if the results do not match and the infrastructure concludes that the AI in the vehicle 1300 is malfunctioning, the server(s) 1378 may transmit a signal to the vehicle 1300 instructing a fail-safe computer of the vehicle 1300 to assume control, notify the passengers, and complete a safe parking maneuver.

For inferencing, the server(s) 1378 may include the GPU(s) 1384 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 14:
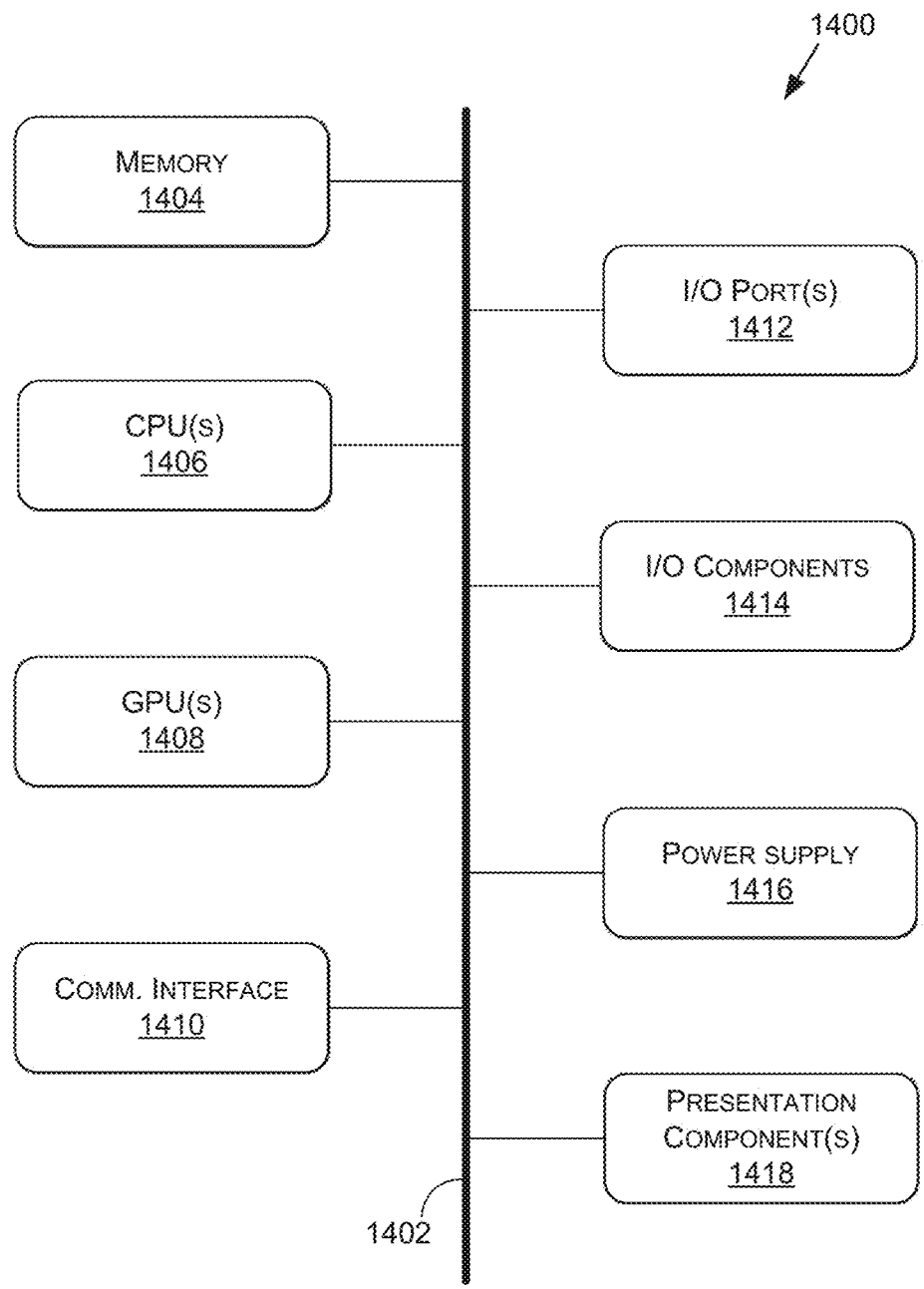
FIG. 14 is a block diagram of an example computing device suitable for use in implementing some embodiments of the present disclosure.

FIG. 14 is a block diagram of an example computing device 1400 suitable for use in implementing some embodiments of the present disclosure. Computing device 1400 may include a bus 1402 that directly or indirectly couples the following devices: memory 1404, one or more central processing units (CPUs) 1406, one or more graphics processing units (GPUs) 1408, a communication interface 1410, input/output (I/O) ports 1412, input/output components 1414, a power supply 1416, and one or more presentation components 1418 (e.g., display(s)).

Although the various blocks of FIG. 14 are shown as connected via the bus 1402 with lines, this is not intended to be limiting and is for clarity only. For example, in some embodiments, a presentation component 1418, such as a display device, may be considered an I/O component 1414 (e.g., if the display is a touch screen). As another example, the CPUs 1406 and/or GPUs 1408 may include memory (e.g., the memory 1404 may be representative of a storage device in addition to the memory of the GPUs 1408, the CPUs 1406, and/or other components). In other words, the computing device of FIG. 14 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 14.

The bus 1402 may represent one or more busses, such as an address bus, a data bus, a control bus, or a combination thereof. The bus 1402 may include one or more bus types, such as an industry standard architecture (ISA) bus, an extended industry standard architecture (ESA) bus, a video electronics standards association (VESA) bus, a peripheral component interconnect (PCI) bus, a peripheral component interconnect express (PCIe) bus, and/or another type of bus.

The memory 1404 may include any of a variety of computer-readable media. The computer-readable media may be any available media that may be accessed by the computing device 1400. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1404 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1400. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1406 may be configured to execute the computer-readable instructions to control one or more components of the computing device 1400 to perform one or more of the methods and/or processes described herein. The CPU(s) 1406 may each include one or more cores (e.g., one, two, four, eight, twenty-eight, seventy-two, etc.) that are capable of handling a multitude of software threads simultaneously. The CPU(s) 1406 may include any type of processor, and may include different types of processors depending on the type of computing device 1400 implemented (e.g., processors with fewer cores for mobile devices and processors with more cores for servers). For example, depending on the type of computing device 1400, the processor may be an ARM processor implemented using Reduced Instruction Set Computing (RISC) or an x86 processor implemented using Complex Instruction Set Computing (CISC). The computing device 1400 may include one or more CPUs 1406 in addition to one or more microprocessors or supplementary co-processors, such as math co-processors.

The GPU(s) 1408 may be used by the computing device 1400 to render graphics (e.g., 3D graphics). The GPU(s) 1408 may include hundreds or thousands of cores that are capable of handling hundreds or thousands of software threads simultaneously. The GPU(s) 1408 may generate pixel data for output images in response to rendering commands (e.g., rendering commands from the CPU(s) 1406 received via a host interface). The GPU(s) 1408 may include graphics memory, such as display memory, for storing pixel data. The display memory may be included as part of the memory 1404. The GPU(s) 708 may include two or more GPUs operating in parallel (e.g., via a link). When combined together, each GPU 1408 may generate pixel data for different portions of an output image or for different output images (e.g., a first GPU for a first image and a second GPU for a second image). Each GPU may include its own memory, or may share memory with other GPUs.

In examples where the computing device 1400 does not include the GPU(s) 1408, the CPU(s) 1406 may be used to render graphics.

The communication interface 1410 may include one or more receivers, transmitters, and/or transceivers that enable the computing device 700 to communicate with other computing devices via an electronic communication network, included wired and/or wireless communications. The communication interface 1410 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1412 may enable the computing device 1400 to be logically coupled to other devices including the I/O components 1414, the presentation component(s) 1418, and/or other components, some of which may be built in to (e.g., integrated in) the computing device 1400. Illustrative I/O components 1414 include a microphone, mouse, keyboard, joystick, game pad, game controller, satellite dish, scanner, printer, wireless device, etc. The I/O components 1414 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1400. The computing device 1400 may be include depth cameras, such as stereoscopic camera systems, infrared camera systems, RGB camera systems, touchscreen technology, and combinations of these, for gesture detection and recognition. Additionally, the computing device 1400 may include accelerometers or gyroscopes (e.g., as part of an inertia measurement unit (IMU)) that enable detection of motion. In some examples, the output of the accelerometers or gyroscopes may be used by the computing device 1400 to render immersive augmented reality or virtual reality.

The power supply 1416 may include a hard-wired power supply, a battery power supply, or a combination thereof. The power supply 1416 may provide power to the computing device 1400 to enable the components of the computing device 1400 to operate.

The presentation component(s) 1418 may include a display (e.g., a monitor, a touch screen, a television screen, a heads-up-display (HUD), other display types, or a combination thereof), speakers, and/or other presentation components. The presentation component(s) 1418 may receive data from other components (e.g., the GPU(s) 1408, the CPU(s) 1406, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    based at least on data representative of a projection image of RADAR data representative of sensor detections generated using one or more RADAR sensors of an ego-actor, computing, (i) using a class confidence head that is of a neural network and comprises a plurality of classification channels, a first output representative of a confidence map for each of the classification channels representing likelihood that at least one individual pixel of one or more pixels belongs to a corresponding class of a plurality of classes of one or more detected objects, and (ii) using an instance regression head that is of the neural network and comprises a plurality of regression channels for each class of the plurality of classes, a second output representative of, for at least one individual regression channel of the plurality of regression channels for a first class of the plurality classes, one or more regressed values of one or more object instances of the one or more detected objects that belong to the first class and are represented by the at least one individual pixel; and
    generating, based at least on the first output and the second output of the neural network, at least one bounding shape corresponding to at least one detected object of the one or more detected objects.

2. The method of claim 1, wherein the one or more regressed values represent, for the at least one individual pixel of the one or more pixels, a vector pointing from the at least one individual pixel to a center of one of the one or more object instances represented by the at least one individual pixel.

3. The method of claim 1, wherein the one or more regressed values represent, for the at least one individual pixel of the one or more pixels, an object width of one of the one or more object instances represented by the at least one individual pixel.

4. The method of claim 1, wherein the one or more regressed values represent, for the at least one individual pixel of the one or more pixels, one or more rotation angles representing orientation relative to the projection image of one or more object instances represented by the at least one individual pixel.

5. The method of claim 1, wherein the projection image includes an overhead image of an environment around the ego-actor, and further wherein the projecting the RADAR data includes orthographically projecting the RADAR data into the overhead image of the environment.

6. The method of claim 1, wherein the projection image includes an overhead image having a specified spatial dimension, and further wherein the data representative of the projection image has the spatial dimension.

7. The method of claim 1, wherein, for at least one other individual pixel of the one or more pixels of the projection image, the data representative of the projection image accumulates reflection characteristics of a subset of motion-compensated sensor detections that intersect the at least one other individual pixel.

8. The method of claim 1, the at least one individual regression channel for the first class regressing a particular type of location, size, or orientation information for a set of the one or more object instances that belong to the first class.

9. The method of claim 1, wherein the first output of the neural network comprises a first tensor storing the confidence map for each of the classification channels, and the second output of the neural network comprises a second tensor storing regressed location, size, and orientation data for the one or more object instances of the one or more detected objects for each class of the plurality of classes, wherein the generating the at least one bounding shape is based on the first tensor and the second tensor.

10. The method of claim 1, wherein the first output of the neural network comprises a first tensor storing the confidence map for each of the classification channels, and the second output of the neural network comprises a second tensor storing regressed location, size, and orientation data for the one or more object instances of the one or more detected objects, wherein the generating the at least one bounding shape comprises:
generating candidate bounding shapes based at least on the first tensor and the second tensor; and
removing duplicate candidates from the candidate bounding shapes based at least on performing at least one of filtering or clustering of the candidate bounding shapes.

11. The method of claim 1, wherein the data representative of the projection image comprises a multi-channel RADAR data tensor encoding the projection image and a set of features representative of reflection characteristics of the sensor detections.

12. A method comprising:
applying RADAR data representing an environment to a neural network to cause the neural network to compute (i) using a class confidence head that is of the neural network and comprises a plurality of classification channels, a first output comprising a first tensor storing a confidence map for each of the classification channels representing likelihood that at least one individual pixel of one or more pixels belongs to a corresponding class of a plurality of classes of one or more detected objects, and (ii) using an instance regression head that is of the neural network and comprises a plurality of regression channels for each class of the plurality of classes, a second output comprising a second tensor storing regressed location, size, and orientation data for one or more object instances of the one or more detected objects for each class of the plurality of classes; and
generating, based at least on the first tensor and the second tensor output by the neural network, one or more bounding shapes corresponding to at least one detected object of the one or more detected objects in the environment.

13. The method of claim 12, the regressed location, size, and orientation data in the second tensor comprising a representation of, for the at least one individual pixel of the one or more pixels, a vector pointing from the at least one individual pixel to a center of one of the one or more object instances represented by the at least one individual pixel.

14. The method of claim 12, the regressed location, size, and orientation data in the second tensor comprising a representation of, for the at least one individual pixel of the one or more pixels, an object width of one of the one or more object instances represented by the at least one individual pixel.

15. The method of claim 12, the regressed location, size, and orientation data in the second tensor comprising a representation of, for the at least one individual pixel of the one or more pixels, one or more rotation angles representing orientation relative to the projection image of one or more object instances represented by the at least one individual pixel.

16. The method of claim 12, wherein the neural network comprises a common trunk connected to a class confidence head and an instance regression head, wherein the class confidence head includes a plurality of channels each configured to generate a corresponding confidence map associating the one or more pixels with a corresponding class of a plurality of classes, wherein the neural network comprises a common trunk connected to the class confidence head and the instance regression head, wherein the plurality of classification channels are each configured to generate a corresponding confidence map for a corresponding one of the plurality of classes, at least one individual regression channel of the plurality of regression channels for a first class of the plurality classes regressing a particular type of location, size, or orientation information for a set of the one or more object instances that belong to the first class.

17. A method comprising:
applying data representative of a projection image representing sensor detections to a neural network to compute (i) using a class confidence head that is of the neural network and comprises a plurality of classification channels, a first output representative of a confidence map for each of the classification channels representing likelihood that at least one individual pixel of one or more pixels belongs to a corresponding class of a plurality of classes of one or more detected objects, and (ii) using an instance regression head that is of the neural network and comprises a plurality of regression channels for each class of the plurality of classes, a second output representative of, for at least one individual regression channel of the plurality of regression channels for a first class of the plurality classes, one or more regressed values of one or more object instances of the one or more detected objects that belong to the first class and are represented by the at least one individual pixel.

18. The method of claim 17, wherein the one or more regressed values represent, for the at least one individual pixel of the one or more pixels, a vector pointing from the at least one individual pixel to a center of one of the one or more object instances represented by the at least one individual pixel.

19. The method of claim 17, wherein the one or more regressed values represent, for the at least one individual pixel of the one or more pixels, an object width of one of the one or more object instances represented by the at least one individual pixel.

20. The method of claim 17, wherein the one or more regressed values represent, for the at least one individual pixel of the one or more pixels, one or more rotation angles representing orientation relative to the projection image of one or more object instances represented by the at least one individual pixel.

* * * * *